(12) United States Patent
Vatne

(10) Patent No.: US 11,878,777 B2
(45) Date of Patent: Jan. 23, 2024

(54) GEOSTATIONARY FLOATING PLATFORM

(71) Applicant: PAV Holding AS, Evje (NO)

(72) Inventor: Per Andreas Vatne, Kristiansand (NO)

(73) Assignee: STATIONMAR AS, Kristiansand (NO)

( * ) Notice: Subject to any disclaimer, the term of this patent is extended or adjusted under 35 U.S.C. 154(b) by 448 days.

(21) Appl. No.: 17/267,678

(22) PCT Filed: Jul. 5, 2019

(86) PCT No.: PCT/NO2019/050142
§ 371 (c)(1),
(2) Date: Feb. 10, 2021

(87) PCT Pub. No.: WO2020/009588
PCT Pub. Date: Jan. 9, 2020

(65) Prior Publication Data
US 2022/0063773 A1    Mar. 3, 2022

(30) Foreign Application Priority Data

Jul. 6, 2018   (NO) .................................. 20180956

(51) Int. Cl.
*B63B 35/44*       (2006.01)
*B63B 1/04*        (2006.01)
(Continued)

(52) U.S. Cl.
CPC ................ *B63B 35/44* (2013.01); *B63B 1/04* (2013.01); *B63B 1/107* (2013.01); *B63B 39/03* (2013.01);
(Continued)

(58) Field of Classification Search
CPC .................................. B63B 35/44; B63B 1/04
See application file for complete search history.

(56) References Cited

U.S. PATENT DOCUMENTS 3,738,113 A * 6/1973 Madary .................. E02B 17/02
                                                                    114/264
4,167,147 A * 9/1979 Bergman ................ B63B 39/03
                                                                    114/265
(Continued)

FOREIGN PATENT DOCUMENTS

| DE | 553677 C1     | 6/1932 |
|----|---------------|--------|
| NO | 20060198 A    | 7/2007 |
| WO | 2013/006881 A1| 1/2013 |

OTHER PUBLICATIONS

NO 20180956; Norwegian Search Report; dated Feb. 6, 2019; 2 pages.

(Continued)

*Primary Examiner* — S. Joseph Morano
*Assistant Examiner* — Jovon E Hayes
(74) *Attorney, Agent, or Firm* — Kilpatrick Townsend & Stockton LLP

(57) ABSTRACT

A system is demonstrated for heave neutralisation of semi-submersible platforms that can be built into any conceivable configuration of such platforms. That the system is also conceivably active and predicatively can be controlled can be concluded by analysing the appended calculation models. As an example FIG. 18, column E, is mentioned, wherein the water volume increments in the rise canister are 37 cubic metres for each half metre of wave height, so that, with reference to column A, from H=10.5 m to H=12 m is 4×37 148 cubic metres more than 150 tonnes—simultaneously with the air pressure, shown in column K, increasing from 123.86 to 131.05 kPa, a difference of just 6.19 kPa (0.0619 bar or 61.9 millibars). Large ballast volumes can be moved out and in of the system at small pressure changes and short response time.

9 Claims, 30 Drawing Sheets

Figure 1:
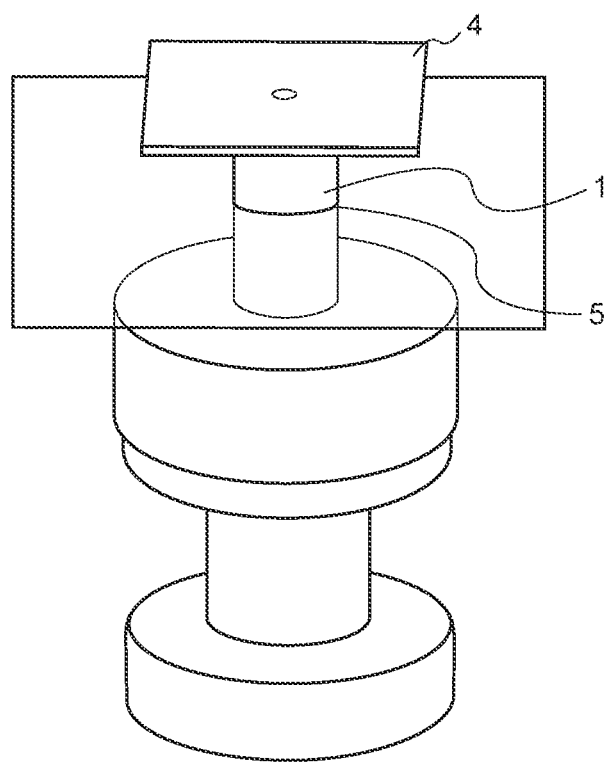
Figure 1:
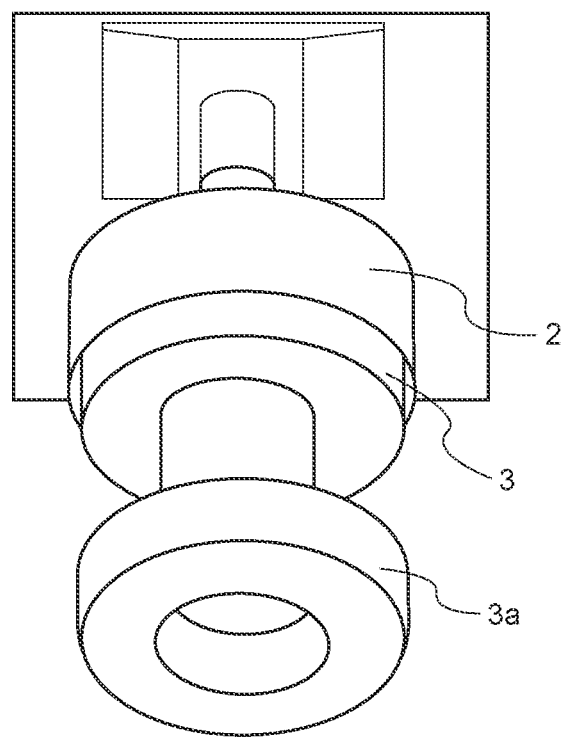

(51) Int. Cl.
  *B63B 1/10* (2006.01)
  *B63B 39/03* (2006.01)
  *B63B 39/06* (2006.01)

(52) U.S. Cl.
  CPC ........ *B63B 39/06* (2013.01); *B63B 2001/044* (2013.01); *B63B 2035/442* (2013.01); *B63B 2039/067* (2013.01); *B63B 2207/00* (2013.01)

(56) References Cited

U.S. PATENT DOCUMENTS

| | | | | |
|---|---|---|---|---|
| 4,181,452 | A * | 1/1980 | Pagezy | E02B 17/021 |
| | | | | 405/203 |
| 4,241,685 | A * | 12/1980 | Mougin | B63B 35/4413 |
| | | | | 405/195.1 |
| 6,241,425 | B1 * | 6/2001 | Kazim | B63B 1/107 |
| | | | | 405/200 |
| 2011/0013989 | A1 * | 1/2011 | Wu | E02B 17/021 |
| | | | | 405/210 |
| 2015/0298774 | A1 * | 10/2015 | Haider | B63B 3/08 |
| | | | | 114/264 |
| 2018/0101174 | A1 | 4/2018 | Rowan | |
| 2022/0063773 | A1 * | 3/2022 | Vatne | B63B 1/107 |
| 2022/0090576 | A1 * | 3/2022 | Sia | F03D 9/11 |

OTHER PUBLICATIONS

CA 3109564; Office Action and Examination Search Report dated Mar. 28, 2023; 4 pages.
PCT/NO2019/050142; International Search Report and Written Opinion; dated Aug. 27, 2019; 15 pages.
Application No. BR112021002951-6 , Office Action, dated Jun. 8, 2023, 4 pages.
Application No. KR10-2021-7011022 , Office Action, dated Aug. 1, 2023, 4 pages.
Application No. EP19830466.9 , Extended European Search Report, dated Mar. 17, 2022, 10 pages.
SG 11202101339Y; Written Opinion; dated Sep. 12, 2022; 5 pages.

* cited by examiner

|   | A | B | C |
|---|---|---|---|
| 1 | D, column | 15,6 | m |
| 2 | Di, column | 9 | m |
| 3 | od Cn | 48 | m |
| 4 | H, max wave height | 24 | m |
| 5 | hL, lowest level hydrostatic height | 20 | m |
| 6 | c, clearance | 4 | m |
| 7 | ΔH, increment | 1,00 | m |
| 8 | Va L, air volume at hL | 10 000,0 | m³ |
| 9 | Seawater specific gravity | 1,025 | kg/L |
| 10 | Gross area column | 191,13 | m² |
| 11 | area Di, column | 63,62 | m² |
| 12 | AD, dry area Column | 127,5 | m² |
| 13 | ΔV, total heave volume variation | 3 060 | m³ |
| 14 | PV konstant, Va L x hL | 200 000 | |
| 15 | | | |
| 16 | | | |

FIG. 6

| | A | B | C | D | E | F | G | H |
|---|---|---|---|---|---|---|---|---|
| | Wave, H Level, m | Va, air volume, m3 | Air volume increment, m3 | Hydrostatic pressure height, h, m | Water volume increment, m3 | WL, water level in Cn, m | WL change increments, m | Area Cn, m2 |
| 1 | | | | | | | | |
| 2 | 0 | 10 000,0 | | 20,0 | | -20 | | 170,4 |
| 3 | 1,00 | 9872,5 | -127,5 | 20,3 | 127,5 | -19,3 | 0,74 | 171,9 |
| 4 | 2,00 | 9745,0 | -127,5 | 20,5 | 127,5 | -18,5 | 0,73 | 173,5 |
| 5 | 3,00 | 9617,4 | -127,5 | 20,8 | 127,5 | -17,8 | 0,73 | 175,2 |
| 6 | 4,00 | 9489,9 | -127,5 | 21,1 | 127,5 | -17,1 | 0,72 | 177,0 |
| 7 | 5,00 | 9362,4 | -127,5 | 21,4 | 127,5 | -16,4 | 0,71 | 178,9 |
| 8 | 6,00 | 9234,9 | -127,5 | 21,7 | 127,5 | -15,7 | 0,71 | 180,9 |
| 9 | 7,00 | 9107,4 | -127,5 | 22,0 | 127,5 | -15,0 | 0,70 | 183,0 |
| 10 | 8,00 | 8979,9 | -127,5 | 22,3 | 127,5 | -14,3 | 0,69 | 185,3 |
| 11 | 9,00 | 8852,3 | -127,5 | 22,6 | 127,5 | -13,6 | 0,68 | 187,8 |
| 12 | 10,00 | 8724,8 | -127,5 | 22,9 | 127,5 | -12,9 | 0,67 | 190,4 |
| 13 | 11,00 | 8597,3 | -127,5 | 23,3 | 127,5 | -12,3 | 0,66 | 193,2 |
| 14 | 12,00 | 8469,8 | -127,5 | 23,6 | 127,5 | -11,6 | 0,65 | 196,3 |
| 15 | 13,00 | 8342,3 | -127,5 | 24,0 | 127,5 | -11,0 | 0,64 | 199,5 |

FIG. 7A

| I | J | K | L | M | N | O | P | Q |
|---|---|---|---|---|---|---|---|---|
| Cn id, m | Area Cn increase, m2 | Air pressure, kPa | Air pressure increase, kPa | CBE increase, kN | Ballast correction for CBE, m3 | AW area correction, m2 | OD area, m2 | Column OD, m |
| 45,68 | 0,00 | 201,11 | 0,00 | 0 | 0,0 | 0,0 | 191,1 | 15,6 |
| 45,66 | 1,58 | 203,70 | 2,60 | 4,11 | 0,41 | 0,409 | 190,7 | 15,6 |
| 45,64 | 1,58 | 206,37 | 2,67 | 4,22 | 0,42 | 0,419 | 190,3 | 15,6 |
| 45,62 | 1,68 | 209,10 | 2,74 | 4,59 | 0,46 | 0,456 | 189,9 | 15,5 |
| 45,59 | 1,78 | 211,91 | 2,81 | 5,00 | 0,50 | 0,497 | 189,4 | 15,5 |
| 45,57 | 1,89 | 214,80 | 2,89 | 5,45 | 0,54 | 0,542 | 188,8 | 15,5 |
| 45,54 | 2,01 | 217,77 | 2,97 | 5,96 | 0,59 | 0,593 | 188,2 | 15,5 |
| 45,51 | 2,14 | 220,82 | 3,05 | 6,54 | 0,65 | 0,650 | 187,6 | 15,5 |
| 45,48 | 2,29 | 223,95 | 3,14 | 7,18 | 0,71 | 0,714 | 186,9 | 15,4 |
| 45,44 | 2,45 | 227,18 | 3,23 | 7,91 | 0,79 | 0,786 | 186,1 | 15,4 |
| 45,40 | 2,63 | 230,50 | 3,32 | 8,73 | 0,87 | 0,868 | 185,2 | 15,4 |
| 45,37 | 2,83 | 233,92 | 3,42 | 9,66 | 0,96 | 0,961 | 184,2 | 15,3 |
| 45,32 | 3,04 | 237,44 | 3,52 | 10,72 | 1,07 | 1,066 | 183,2 | 15,3 |
| 45,28 | 3,29 | 241,07 | 3,63 | 11,93 | 1,19 | 1,187 | 182,0 | 15,2 |

FIG. 7B

| 45,23 | 3,56 | 244,81 | 3,74 | 13,33 | 1,33 | 1,325 | 180,7 | 15,2 |
|---|---|---|---|---|---|---|---|---|
| 45,17 | 3,87 | 248,67 | 3,86 | 14,93 | 1,49 | 1,485 | 179,2 | 15,1 |
| 45,11 | 4,22 | 252,65 | 3,98 | 16,80 | 1,67 | 1,670 | 177,5 | 15,0 |
| 45,05 | 4,61 | 256,77 | 4,11 | 18,97 | 1,89 | 1,886 | 175,6 | 15,0 |
| 44,98 | 5,06 | 261,02 | 4,25 | 21,51 | 2,14 | 2,139 | 173,5 | 14,9 |
| 44,90 | 5,58 | 265,41 | 4,39 | 24,51 | 2,44 | 2,437 | 171,0 | 14,8 |
| 44,81 | 6,18 | 269,95 | 4,54 | 28,06 | 2,79 | 2,791 | 168,3 | 14,6 |
| 44,71 | 6,87 | 279,65 | 4,70 | 32,32 | 3,21 | 3,214 | 165,0 | 14,5 |
| 44,60 | 7,69 | 279,52 | 4,87 | 37,45 | 3,72 | 3,725 | 161,3 | 14,3 |
| 44,48 | 8,66 | 284,56 | 5,04 | 43,70 | 4,35 | 4,346 | 157,0 | 14,1 |
| 44,34 | 9,83 | 289,79 | 5,23 | 51,38 | 5,11 | 5,110 | 151,9 | 13,9 |
| -1,35 | 95,32 | 88,69 | 88,69 | 394,95 | 39,28 | 39,3 | -39,3 | -1,7 |

FIG. 7D

| | A | B | C |
|---|---|---|---|
| 1 | D, column | 9 | m |
| 2 | Column wet area at H 0 | 40 | m² |
| 3 | H, max wave height | 12 | m |
| 4 | hL, lowest level hydrostatic height | 8,5 | m |
| 5 | c, clearance | 1 | m |
| 6 | ΔH, increment | 0,50 | m |
| 7 | Va L, air volume at hL | 800,0 | m³ |
| 8 | Seawater specific gravity | 1,025 | kg/L |
| 9 | Gross area column | 63,62 | m² |
| 10 | Ad, dry area Column | 23,6 | m² |
| 11 | ΔV, total heave volume variation | 2,83 | m³ |
| 12 | PV konstant, Va L x hL | 6 800 | |
| 13 | | | |

FIG. 11

| | A | B | C | D | E | F | G | H |
|---|---|---|---|---|---|---|---|---|
| 1 | Wave, H Level, m | Va, air volume, m3 | Air volume increment, m3 | Hydrostatic pressure height, h, m | Water volume increment, m3 | WL, water level in Cn, m | WL change increments, m | Area Cn, m2 |
| 2 | 0 | 800,0 | | 8,5 | | -8,5 | | 31,4 |
| 3 | 0,50 | 788,2 | -11,8 | 8,6 | 11,8 | -8,1 | 0,4 | 31,7 |
| 4 | 1,00 | 776,4 | -11,8 | 8,8 | 11,8 | -7,8 | 0,4 | 32,0 |
| 5 | 1,50 | 764,6 | -11,8 | 8,9 | 11,8 | -7,4 | 0,4 | 32,4 |
| 6 | 2,00 | 752,8 | -11,8 | 9,0 | 11,8 | -7,0 | 0,4 | 32,8 |
| 7 | 2,50 | 741,0 | -11,8 | 9,2 | 11,8 | -6,7 | 0,4 | 33,2 |
| 8 | 3,00 | 729,1 | -11,8 | 9,3 | 11,8 | -6,3 | 0,4 | 33,6 |
| 9 | 3,50 | 717,3 | -11,8 | 9,5 | 11,8 | -6,0 | 0,4 | 34,1 |
| 10 | 4,00 | 705,5 | -11,8 | 9,6 | 11,8 | -5,6 | 0,3 | 34,6 |
| 11 | 4,50 | 693,7 | -11,8 | 9,8 | 11,8 | -5,3 | 0,3 | 35,2 |
| 12 | 5,00 | 681,9 | -11,8 | 10,0 | 11,8 | -5,0 | 0,3 | 35,8 |
| 13 | 5,50 | 670,1 | -11,8 | 10,1 | 11,8 | -4,6 | 0,3 | 36,4 |
| 14 | 6,00 | 658,3 | -11,8 | 10,3 | 11,8 | -4,3 | 0,3 | 37,1 |
| 15 | 6,50 | 646,5 | -11,8 | 10,5 | 11,8 | -4,0 | 0,3 | 37,9 |

FIG. 12A

| I | J | K | L | M | N | O | P | Q | R |
|---|---|---|---|---|---|---|---|---|---|
| Cn D, m | Area Cn increase, m2 | Air pressure, kPa | Air pressure increase, kPa | CBE increase, kN | Ballast correction for CBE, m3 | AW area correction, m2 | AW area, m2 | AD, column dry area, m2 | Column dry d, m |
| 11,00 | 0,00 | 85,47 | 0,00 | 0 | 0,0 | 0,0 | 40,0 | 23,6 | 5,484 |
| 11,02 | 0,33 | 86,75 | 1,28 | 0,43 | 0,04 | 0,085 | 40,1 | 23,5 | 5,474 |
| 11,03 | 0,33 | 88,07 | 1,32 | 0,44 | 0,04 | 0,087 | 40,2 | 23,4 | 5,464 |
| 11,06 | 0,36 | 89,43 | 1,36 | 0,48 | 0,05 | 0,096 | 40,3 | 23,3 | 5,452 |
| 11,08 | 0,38 | 90,83 | 1,40 | 0,53 | 0,05 | 0,106 | 40,4 | 23,2 | 5,440 |
| 11,10 | 0,41 | 92,28 | 1,45 | 0,59 | 0,06 | 0,118 | 40,5 | 23,1 | 5,426 |
| 11,13 | 0,44 | 93,77 | 1,49 | 0,66 | 0,07 | 0,131 | 40,6 | 23,0 | 5,411 |
| 11,15 | 0,47 | 95,32 | 1,54 | 0,73 | 0,07 | 0,146 | 40,8 | 22,8 | 5,394 |
| 11,18 | 0,51 | 96,91 | 1,60 | 0,82 | 0,08 | 0,163 | 40,9 | 22,7 | 5,374 |
| 11,21 | 0,56 | 98,56 | 1,65 | 0,92 | 0,09 | 0,183 | 41,1 | 22,5 | 5,353 |
| 11,25 | 0,60 | 100,27 | 1,71 | 1,03 | 0,10 | 0,205 | 41,3 | 22,3 | 5,328 |
| 11,29 | 0,66 | 102,04 | 1,77 | 1,17 | 0,12 | 0,232 | 41,6 | 22,1 | 5,300 |
| 11,33 | 0,72 | 103,87 | 1,83 | 1,32 | 0,13 | 0,263 | 41,8 | 21,8 | 5,269 |
| 11,37 | 0,79 | 105,76 | 1,90 | 1,51 | 0,15 | 0,299 | 42,1 | 21,5 | 5,232 |

FIG. 12B

FIG. 12D

| | | | | | | | | | | |
|---|---|---|---|---|---|---|---|---|---|---|
| 11,42 | 0,88 | 107,73 |  | 1,72 |  | 0,17 | 0,343 | 42,5 | 21,2 | 5,191 |
| 11,47 | 0,97 | 109,78 | 2,04 | 1,98 |  | 0,20 | 0,394 | 42,9 | 20,8 | 5,142 |
| 11,53 | 1,08 | 111,90 | 2,12 | 2,29 |  | 0,23 | 0,456 | 43,3 | 20,3 | 5,085 |
| 11,60 | 1,21 | 114,10 | 2,20 | 2,67 |  | 0,27 | 0,531 | 43,8 | 19,8 | 5,018 |
| 11,67 | 1,36 | 116,40 | 2,29 | 3,13 |  | 0,31 | 0,622 | 44,5 | 19,2 | 4,939 |
| 11,76 | 1,55 | 118,78 | 2,39 | 3,70 |  | 0,37 | 0,735 | 45,2 | 18,4 | 4,843 |
| 11,85 | 1,77 | 121,27 | 2,49 | 4,41 |  | 0,44 | 0,876 | 46,1 | 17,5 | 4,727 |
| 11,96 | 2,04 | 123,86 | 2,59 | 5,30 |  | 0,53 | 1,055 | 47,1 | 16,5 | 4,582 |
| 12,09 | 2,39 | 126,57 | 2,71 | 6,46 |  | 0,64 | 1,285 | 48,4 | 15,2 | 4,400 |
| 12,24 | 2,82 | 129,40 | 2,83 | 7,97 |  | 0,79 | 1,585 | 50,0 | 13,6 | 4,165 |
| 12,41 | 3,37 | 132,36 | 2,96 | 9,98 |  | 0,99 | 1,985 | 52,0 | 11,6 | 3,849 |
| 1,42 | 26,02 | 46,89 | 46,89 | 60,23 | 5,99 | 12,0 | 12,0 | 12,0 | -12,0 | -1,635 |

| | A | B | C | D |
|---|---|---|---|---|
| 1 | | | | |
| 2 | 1 | L, side column | 13 | m |
| 3 | 2 | B, side column | 13 | m |
| 4 | 3 | Column wet area, AW | 95,00 | m² |
| 5 | 4 | H, max wave height | 12 | m |
| 6 | 5 | hL, lowest level hydrostatic height | 8,9 | m |
| 7 | 6 | c, clearance | 1 | m |
| 8 | 7 | ΔH, increment | 0,50 | m |
| 9 | 8 | Va L, air volume at hL | 2 800,0 | m³ |
| 10 | 9 | Seawater specific gravity | 1,025 | |
| 11 | 10 | Gross area column | 169,00 | m² |
| 12 | 11 | AD, dry area Column | 74,0 | m² |
| 13 | 12 | ΔV, total heave volume variation | 888 | m³ |
| 14 | 13 | PV konstant, Va L x hL | 24 920 | |
| 15 | 14 | Area Cn at hL | 97,16 | m² |

FIG. 17

|  | A | B | C | D | E | F | G | H |
|---|---|---|---|---|---|---|---|---|
| 1 | Wave, H Level, m | Va, air volume, m3 | Air volume increment, m3 | Hydrostatic pressure height, h, m | Water volume increment, m3 | WL, water level in Cn, m | WL change increments, m | ACn, area Cn, m2 |
| 2 | 0 | 2800,0 |  |  |  |  |  | 97,2 |
| 3 | 0,50 | 2763,0 | -37,0 | 8,9 | 37,0 | -8,9 | 0,38 | 97,2 |
| 4 | 1,00 | 2726,0 | -37,0 | 9,0 | 37,0 | -8,5 | 0,38 | 97,2 |
| 5 | 1,50 | 2689,0 | -37,0 | 9,1 | 37,0 | -8,1 | 0,38 | 98,0 |
| 6 | 2,00 | 2652,0 | -37,0 | 9,3 | 37,0 | -7,8 | 0,37 | 98,9 |
| 7 | 2,50 | 2615,0 | -37,0 | 9,4 | 37,0 | -7,4 | 0,37 | 99,8 |
| 8 | 3,00 | 2578,0 | -37,0 | 9,5 | 37,0 | -7,0 | 0,37 | 100,8 |
| 9 | 3,50 | 2541,0 | -37,0 | 9,7 | 37,0 | -6,7 | 0,36 | 101,9 |
| 10 | 4,00 | 2504,0 | -37,0 | 9,8 | 37,0 | -6,3 | 0,36 | 103,0 |
| 11 | 4,50 | 2467,0 | -37,0 | 10,0 | 37,0 | -6,0 | 0,36 | 104,2 |
| 12 | 5,00 | 2430,0 | -37,0 | 10,1 | 37,0 | -5,6 | 0,35 | 105,5 |
| 13 | 5,50 | 2393,0 | -37,0 | 10,3 | 37,0 | -5,3 | 0,35 | 106,9 |
| 14 | 6,00 | 2356,0 | -37,0 | 10,4 | 37,0 | -4,9 | 0,34 | 108,4 |
| 15 | 6,50 | 2319,0 | -37,0 | 10,6 | 37,0 | -4,6 | 0,34 | 110,0 |
|  |  |  | -37,0 | 10,7 | 37,0 | -4,2 | 0,33 |  |

FIG. 18A

| I | J | K | L | M | N | O | P | Q |
|---|---|---|---|---|---|---|---|---|
| Cn B and L, m | Area Cn increase, m2 | Air pressure, kPa | Air pressure increase, kPa | CBE increase, kN | Ballast correction for CBE, m3 | AW area correction, m2 | AW area, m2 | AWL side wall length, m |
| 8,48 | 0,00 | 89,49 | 0,00 | 0 | 0,0 | | 95,0 | 7,308 |
| 8,48 | 0,00 | 90,69 | 1,20 | 0,0 | 0,00 | 0,000 | 95,00 | 7,308 |
| 8,48 | 0,00 | 91,92 | 1,23 | 0,0 | 0,00 | 0,000 | 95,00 | 7,308 |
| 8,43 | 0,83 | 93,19 | 1,26 | 1,1 | 0,10 | 0,001 | 95,00 | 7,308 |
| 8,37 | 0,88 | 94,49 | 1,30 | 1,1 | 0,11 | 0,001 | 95,00 | 7,308 |
| 8,32 | 0,94 | 95,82 | 1,34 | 1,3 | 0,12 | 0,001 | 95,00 | 7,308 |
| 8,26 | 0,99 | 97,20 | 1,38 | 1,4 | 0,14 | 0,001 | 95,00 | 7,308 |
| 8,19 | 1,06 | 98,61 | 1,42 | 1,5 | 0,15 | 0,002 | 95,00 | 7,308 |
| 8,12 | 1,13 | 100,07 | 1,46 | 1,6 | 0,16 | 0,002 | 95,00 | 7,308 |
| 8,05 | 1,21 | 101,57 | 1,50 | 1,8 | 0,18 | 0,002 | 95,00 | 7,308 |
| 7,97 | 1,29 | 103,12 | 1,55 | 2,0 | 0,20 | 0,002 | 95,00 | 7,308 |
| 7,88 | 1,39 | 104,71 | 1,59 | 2,2 | 0,22 | 0,002 | 95,00 | 7,308 |
| 7,79 | 1,49 | 106,36 | 1,64 | 2,4 | 0,24 | 0,003 | 95,00 | 7,308 |
| 7,68 | 1,60 | 108,05 | 1,70 | 2,7 | 0,27 | 0,003 | 95,00 | 7,308 |

FIG. 18B

| | | | | | | | |
|---|---|---|---|---|---|---|---|
| 7,57 | 1,73 | 109,81 | 1,75 | 3,0 | 0,30 | 0,003 | 7,308 |
| 7,44 | 1,88 | 111,62 | 1,81 | 3,4 | 0,34 | 0,004 | 95,00 | 7,308 |
| 7,31 | 2,04 | 113,49 | 1,87 | 3,8 | 0,38 | 0,004 | 95,00 | 7,308 |
| 7,15 | 2,22 | 115,42 | 1,93 | 4,3 | 0,43 | 0,004 | 95,00 | 7,308 |
| 6,98 | 2,43 | 117,42 | 2,00 | 4,9 | 0,48 | 0,005 | 95,00 | 7,308 |
| 6,79 | 2,67 | 119,49 | 2,07 | 5,5 | 0,55 | 0,006 | 95,01 | 7,308 |
| 6,57 | 2,94 | 121,64 | 2,15 | 6,3 | 0,63 | 0,007 | 95,01 | 7,308 |
| 6,32 | 3,25 | 123,86 | 2,22 | 7,2 | 0,72 | 0,008 | 95,01 | 7,308 |
| 6,02 | 3,62 | 126,17 | 2,31 | 8,3 | 0,83 | 0,009 | 95,01 | 7,308 |
| 5,68 | 4,05 | 128,57 | 2,40 | 9,7 | 0,96 | 0,010 | 95,01 | 7,308 |
| 5,26 | 4,55 | 131,05 | 2,49 | 11,3 | 1,13 | 0,012 | 95,01 | 7,309 |
| 3,22 | 44,17 | 41,56 | 41,56 | 87 | 8,6 | 0,091 | | -0,001 |

FIG. 18D

GEOSTATIONARY FLOATING PLATFORM

FIELD AND BACKGROUND OF THE INVENTION

The present invention describes a semisubmersible floating platform with a built-in system for constant buoyancy at varying sea level at wave and tidal movement.

Such platforms may have large distribution potential for mineral extraction on the sea bed, for oil and gas extraction under the sea bed, as basis for pontoon bridges, wind turbines, solar power or other constructions.

SUMMARY OF THE INVENTION

A floating platform is provided, comprising a structure, which is carried by one or more columns placed on one or more buoyancy bodies, characterized in that
the column or columns comprise a built-in rise canister, equipped with at least one opening in a lower part, so that fluid communication is provided between the rise canister and a body of water; and
the volume of the rise canister increases with increasing height, so that the rise canister has increasing water surface area at rising water level.

At an upper part, the rise canister is in gas connection with a gas-filled chamber.

In one embodiment:
the rise canister is gas-connected with a first tank via a first valve, and the first tank contains a gas, for example air, and is configured to have a higher pressure than the highest pressure in the rise canister when the water in the rise canister is at an upper level, and
the rise canister is gas-connected with a second tank via a second valve, and the second tank contains a gas, for example air, and is configured to have a lower pressure than the pressure in the rise canister when the water in the rise canister is at a lower level.

The second tank preferably comprises a third valve for ventilation to the atmosphere. A compressor can be gas-connected with the first tank and be arranged to maintain an overpressure in the first tank.

In one embodiment, the column or columns at a part that is above the rise canister have an outer diameter, which is decreasing upwards.

The buoyancy body or the buoyancy bodies have sufficient draft (Norwegian: dypgang) for not being significantly affected by surface waves. The floating platform is preferably a semisubmersible platform (Norwegian: halvt nedsenkbar plattform).

The platform mentioned here comprises via the water surface one—or more—columns each based on a buoyancy body deep enough for not being raised or lowered by the wave movements on the surface.

The present invention describes a heave-neutralising automatic ballast system without movable parts. The system comprises a rise canister with one or more openings in a lower part, were the level of the water surface in the rise canister is balanced by a confined volume of air or other gas at a slight overpressure. The top level of the rise canister must be below the lowest water surface around the column at the bottom of the passing wave. The air volume has a coupling to an adjusted size of reservoir onboard. At rising wave height, the hydrostatic pressure in the rise canister increases and drives the water surface upwards and compresses the confined air volume. The rising water level that encompasses the column leads to increasing buoyancy, and at the same time the increasing water volume in the rise canister under the splash zone leads to correspondingly reduced buoyancy, as the air volume is compressed. These two volumes offset each other at any time and thereby neutralise the heave forces of the floating rig.

For the system to be energy-neutral, the value of the pressure multiplied by the volume in the confined air reservoir must be constant, pV=constant. The sectional area of the column, maximum wave height and that pV=constant are the main criteria for the design basis.

The semisubmersible floating platform has one or more columns, which are arranged to pass through the splash zone of the varying water level of the surrounding waves and which are connected with a floating body with sufficient draft not to be significantly affected by the surface waves within the certain limitations of varying water levels in the splash zone of the waves. The invention comprises a built-in system for constant displacement to thereby neutralise the heave effect of the platform at varying wave height. This is obtained by, on a level below the bottom of the waves, a platform being built into a rise canister with increasing water surface and which is in fluid-communicating connection with the surrounding bodies of water through one or more openings positioned on a level below the lowest level in the rise canister. The level of the water surface in the rise canister is controlled by a confined, compressed, gas-filled volume in the floating body, which is either placed immediately above the highest level of the water surface in the rise canister or at another place in the platform and is then connected with pipes or channels. At rising water level around the column, the hydrostatic pressure in the rise canister increases, and the water level in the rise canister rises and compresses the air volume above it. At rising water level, the buoyancy increases by the increasing displaced volume of the column in the splash zone, and a precisely corresponding volume increases in the rise canister below the water surface, compresses the confined air and thereby reduces the buoyancy correspondingly. The area variation of the rise canister together with the contained gas volume is configured so that the value of pV for the gas volume is constant within the entire volume variation, and the increased air pressure above the water surface in the rise canister in combination with the increasing water surface area results in an increasing buoyancy component that is compensated for by the wet area of the column being reduced in the splash zone at rising wave height.

The invention furthermore comprises a semisubmersible floating platform, which is dynamically positioned vertically by the built-in system for neutralisation of heaving is equipped with a system for positive or negative additional energy to offset unwanted heaving tendencies caused by viscous frictions on the hull or hydrodynamic and/or aerodynamic resistance factors in the system. The air reservoir in the system is coupled to a tank with a storage pressure lower than the lowest system pressure at the lowest water level in the rise canister, and a second tank with a storage pressure above the highest system pressure at the highest water level in the rise canister, so that a control system with developed algorithms that is in connection with geostationary references can predictively actively control this individually for each column and thereby keep the platform horizontal and heave-neutral.

DESCRIPTION OF THE EMBODIMENTS OF THE INVENTION

In the following, three different semisubmersible platform constructions are described with different built-in alternatives for the system.

FIG. 1 shows a one-column platform, where the reference numeral 1 indicates a column, here with a circular cross section. The reference numeral 2 indicates a rise canister and 3 a buoyancy body—pontoon—here extended by a more deeply attached uniform mass ballast module 3a of for example concrete, to give the platform sufficient stability The ballast module 3a is optional, and the invention shall not be limited to this embodiment. Furthermore, the reference numeral 4 indicates a structure, such as e.g. a deck for payload, and 5 indicates water level at zero wave height. The rise canister 2 is here built into the circular pontoon.

Figure 2:
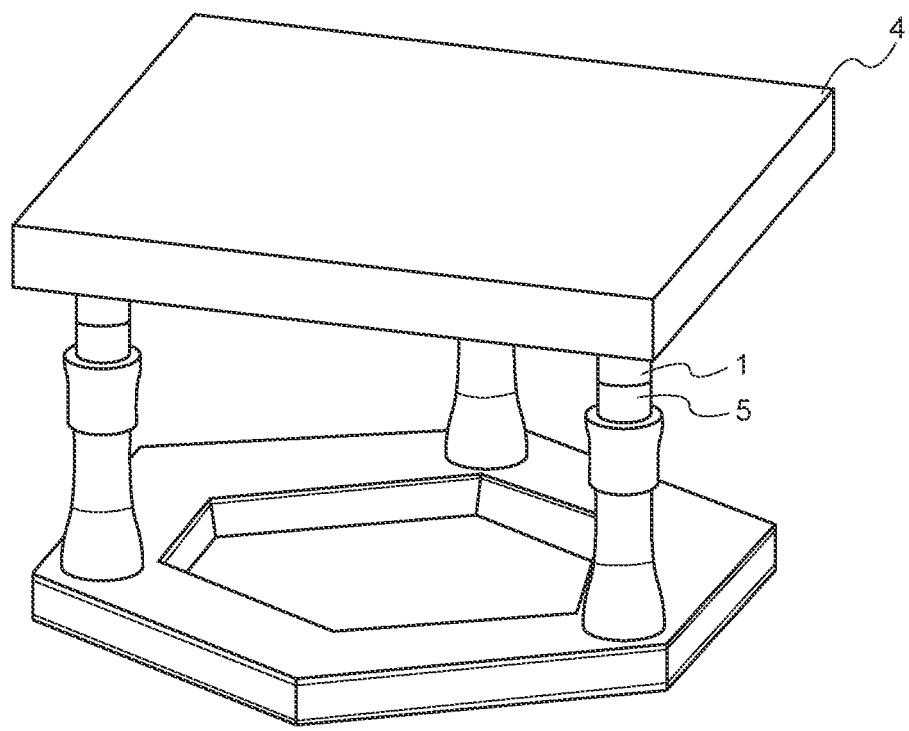
Figure 2:
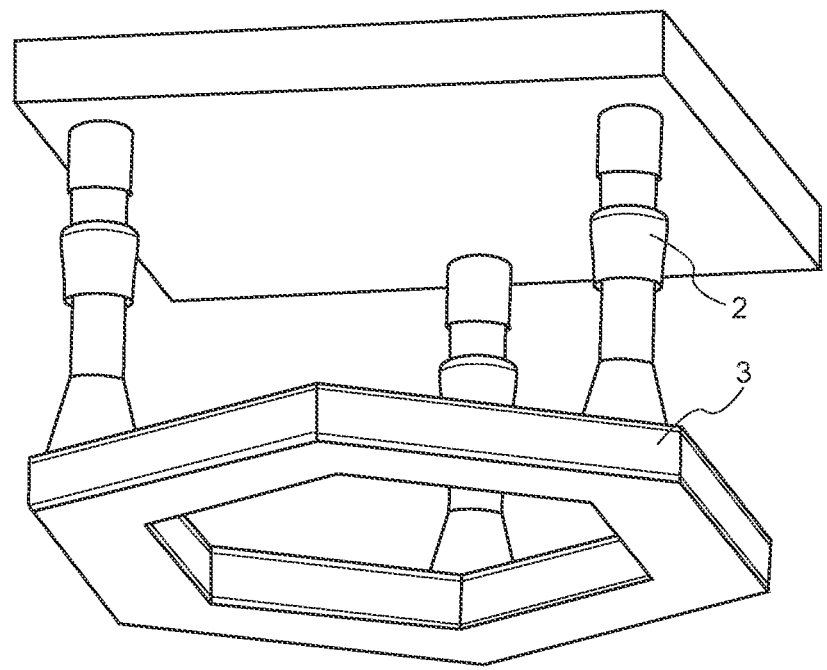

FIG. 2 shows a three-column platform with the same elements as shown in FIG. 1, but here the pontoon 3 is shaped as a hexagonal torus. The idea of this construction with three columns and 'doughnut'-shaped pontoon is that it should be equally affected by sea currents regardless of direction. The rise canisters 2 are built around the circular columns 1.

Figure 3:
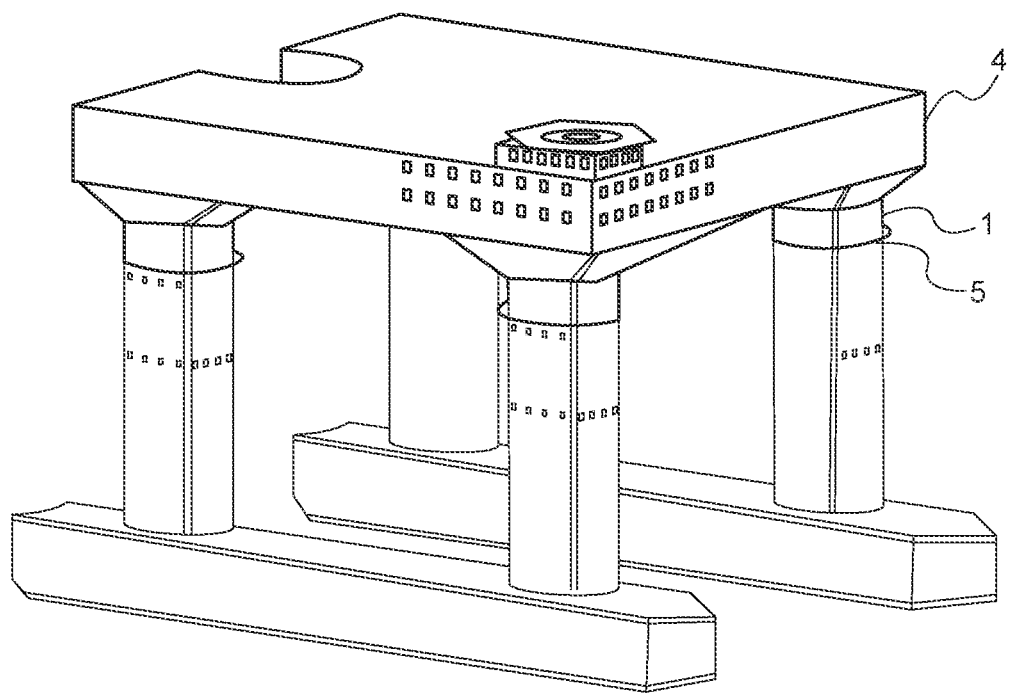
Figure 3:
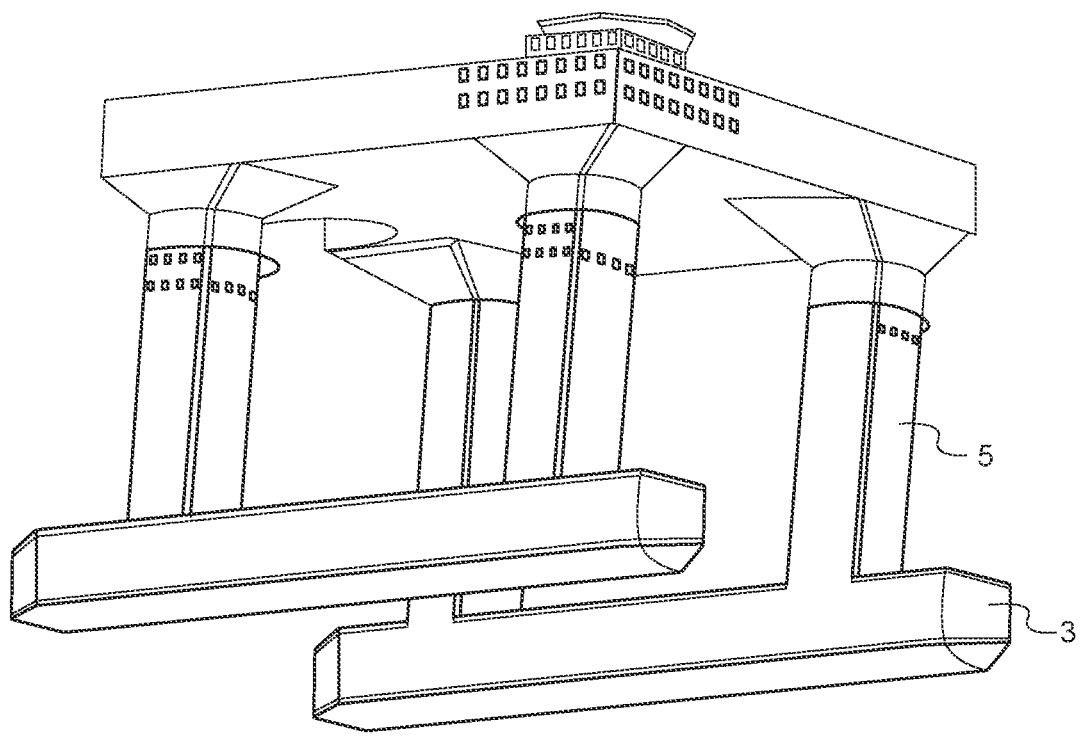

FIG. 3 shows a platform with four columns 1 and two pontoons 3 in longitudinal direction. In this embodiment, the columns 1 have an approximate quadratic cross section, and the rise canisters 2 are here built into the columns 1 shaped in a quadratic cross section.

Figure 4:
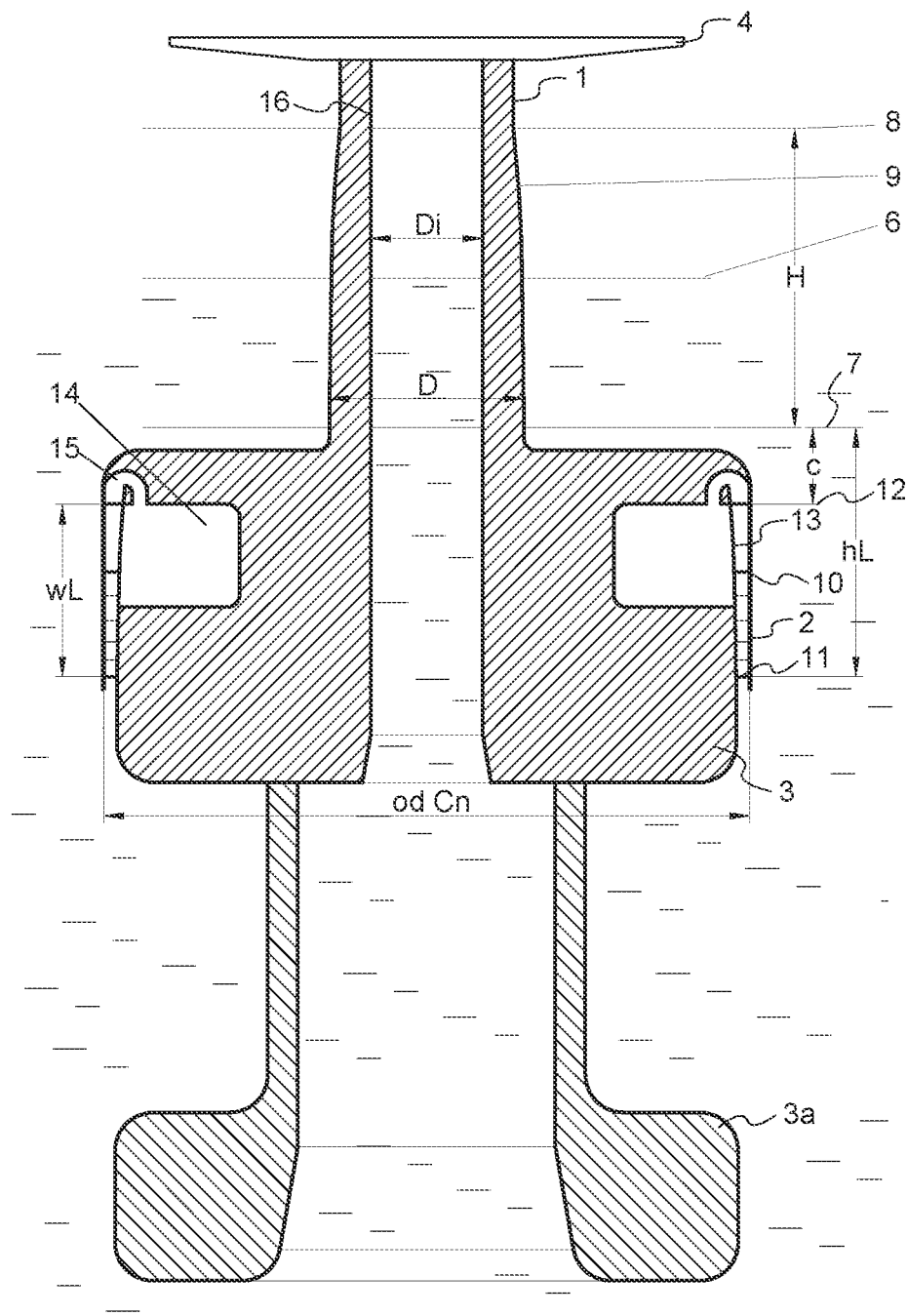

FIG. 4 is a vertical centre section of the platform from FIG. 1. The letter designations are references to calculations in FIG. 6. Sea level at zero wave is reference 6, the lowest level of wave bottom is 7, and the wave crest is 8. The column 1 has a part 9 with decreasing outer diameter upwards, i.e. towards the wave crest 8. In the rise canister 2, which is in fluid communication with the surrounding body of water via the opening 40, the medium level 10 corresponds to the zero wave level 6. The lowest level in the rise canister is 11 and the highest level is 12. The inner diameter 13 of the rise canister 2 is decreasing towards the peak level 12, so that the volume of the rise canister increases in step with increasing height (i.e. upwards in the direction towards the deck 4). The chamber 14 constitutes a reservoir (gas, but preferably and most practically, air) and is in connection with the top of the rise canister 2 via the openings 15 internally in the construction. The column 1 in this platform construction has the through-going opening 16. The difference in area through the water line is thus given by the difference between the diameters D and Di.

Figure 5:
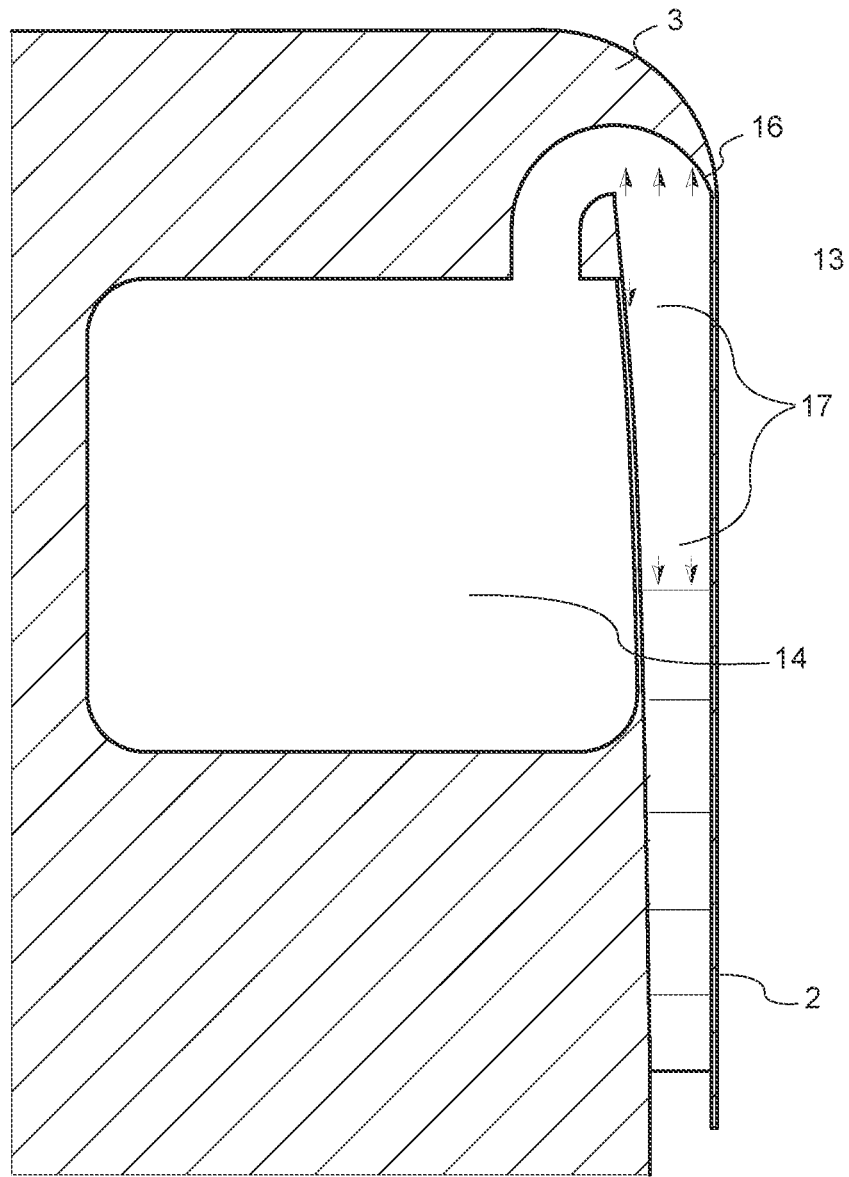
Figure 7C:
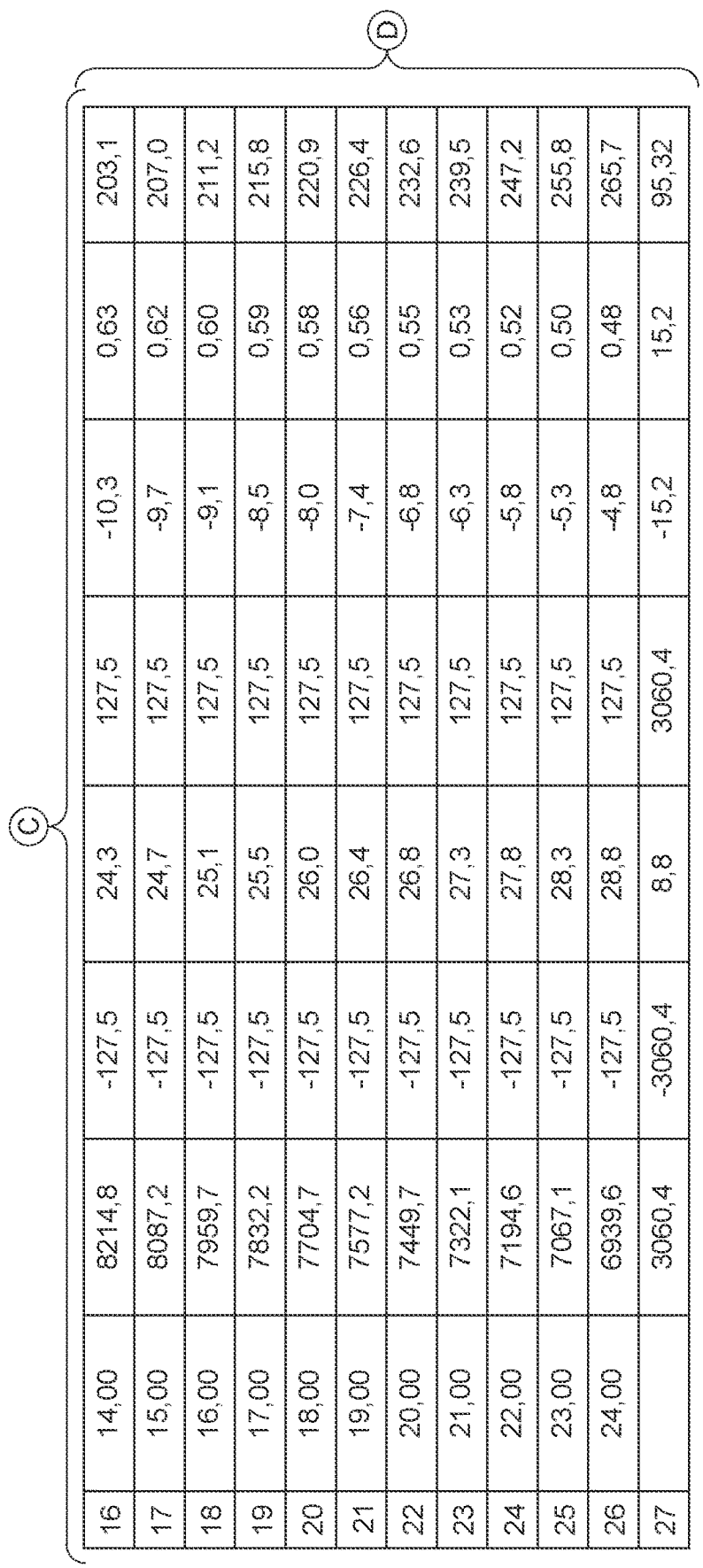

FIG. 5 shows an enlarged section of the pontoon 3, the rise canister 2, the curved internal wall 13 and the air reservoir 14. The arrows 16 mark the force component of the air pressure vertically upwards, and the arrows 17 mark the force components of the same pressure downwards. At rising water level, the water surface area increases and at the same time, the pressure in the reservoir increases. This results in an increasing buoyancy component, which has to be compensated for. This is obtained by an increasing water surface encompassing the column at rising level, as illustrated in FIG. 4, no. 9.

A mathematical description of the curvature of the inner diameter in the rise canister 13 and the outer diameter of the column 9 is demonstrated by the calculations in FIGS. 6, 7A-7D, 8 and 9.

FIG. 6 shows constants and initial values of the difference alignment stated in an Excel table in FIGS. 7A-D. The formulas below have been copied from the Excel sheet.

Explanation of the Initial Values on FIG. 6, Column B:
Initial values in cells B1 to B4 are the basic criteria for the construction.
Initial value for hL, cell B5, is set as low as possible for the equation to balance. The same applies to the value of total air volume, Va in B8.

The initial value c, B6, is a practical balancing.

The initial value AH, B7, is increments of the water level H in the differential equation in FIG. 7A-D, from cells A2 to A26.

The value in cell B9 is the specific gravity of sea water.

Based on the initial values mentioned above, the values from cells B10 to B14 in FIG. 6 are calculated Explanation of the Differential Equation in FIGS. 7A, 7B, 7C, and 7D, Columns a to Q:

The value in cell A2 is set at 0 as onset value for H. A3 is A2 plus increment 1, which is from FIG. 6, cell B7.

Column B calculates the air volume after the incremented compressing at rising wave height, H. The value in B2 is copied from FIG. 6, B8. The value in B3 is the value from B1 minus the value in A3 multiplied by the area of the dry column, FIG. 6, B11. This is the new air volume after the compression after the rise of the water level H. Formula: B3=(B8 in FIG. 6)−(B12 in FIG. 6)*A3).

Column C calculates how much the air volume is reduced. Formula: C3=B3−B2. Column D calculates the new hydrostatic pressure height h. This is the result of the pV constant, FIG. 6, B14, divided by the value of B3. Formula: D3=(B14 in FIG. 6)/B3).

Column E calculates the increased water volume in the rise canister 2 to be the same as the values in column C, but with opposite sign.

Column F calculates the water level in the rise canister 2, WL. F2 is the initial value from FIG. 6, B5. F3 is the value in A3 minus the value D3. Formula: F3=A3−D3.

Column G gives the incremented rise in the water level WL in the rise canister 2, this is the difference between the new and the previous value in column F. Formula: G3=−F2+F3.

Column H gives the area of the water surface in the rise canister 2. This is the result of dividing the value in column E by the value on the same line in column G. Formula: H3=E3/G3.

In column I, the final inner diameter in the rise canister 2 is calculated for each incremented level of WL. The outer diameter of the rise canister is given in FIG. 6, B3. The area given by this outer diameter minus the values in column H gives the values in column I. Formula: I3=2*ROT((((B3 in FIG. 6)/2)^2*π−H3)/π).

Column J calculates the increase in the area of the water surface in the rise canister 2. The value J3 is H3 minus H2.

Column K converts the current hydrostatic pressure height h in column D to pressure in kPa. The values in column D are multiplied by the specific gravity of the sea water, FIG. 6, B9, as well as the gravity g. Formula: K3=D3*(B9 in FIG. 6)*9.81.

Column L states the increase in the air pressure above the water surface for each increment in the rise canister 2. Formula: L3=K3−K2.

In column M, the effect of the increasing buoyancy at the increasing air pressure in column L is calculated. The values appear by the values in column J being multiplied by the values on the same line in column L. Formula: M3=J3×L3.

In column N the necessary ballast volume to compensate for the increasing buoyancy in column M is calculated. Formula: N3=M3/(9.81*(B9 in FIG. 6)).

In column O the area of the increasing wet water surface that encompasses the column 1 at wave height H is calculated. Formula: O3=N3/((B7 in FIG. 6)).

In column P the decreasing diameter of the column is calculated. Formula: P3=P2−O3. (P2=(B10 in FIG. 6)).

Column Q calculates the adjusted column diameter for each increment. Formula: Q3=2*ROT(P3/PI( ))

Figure 8:
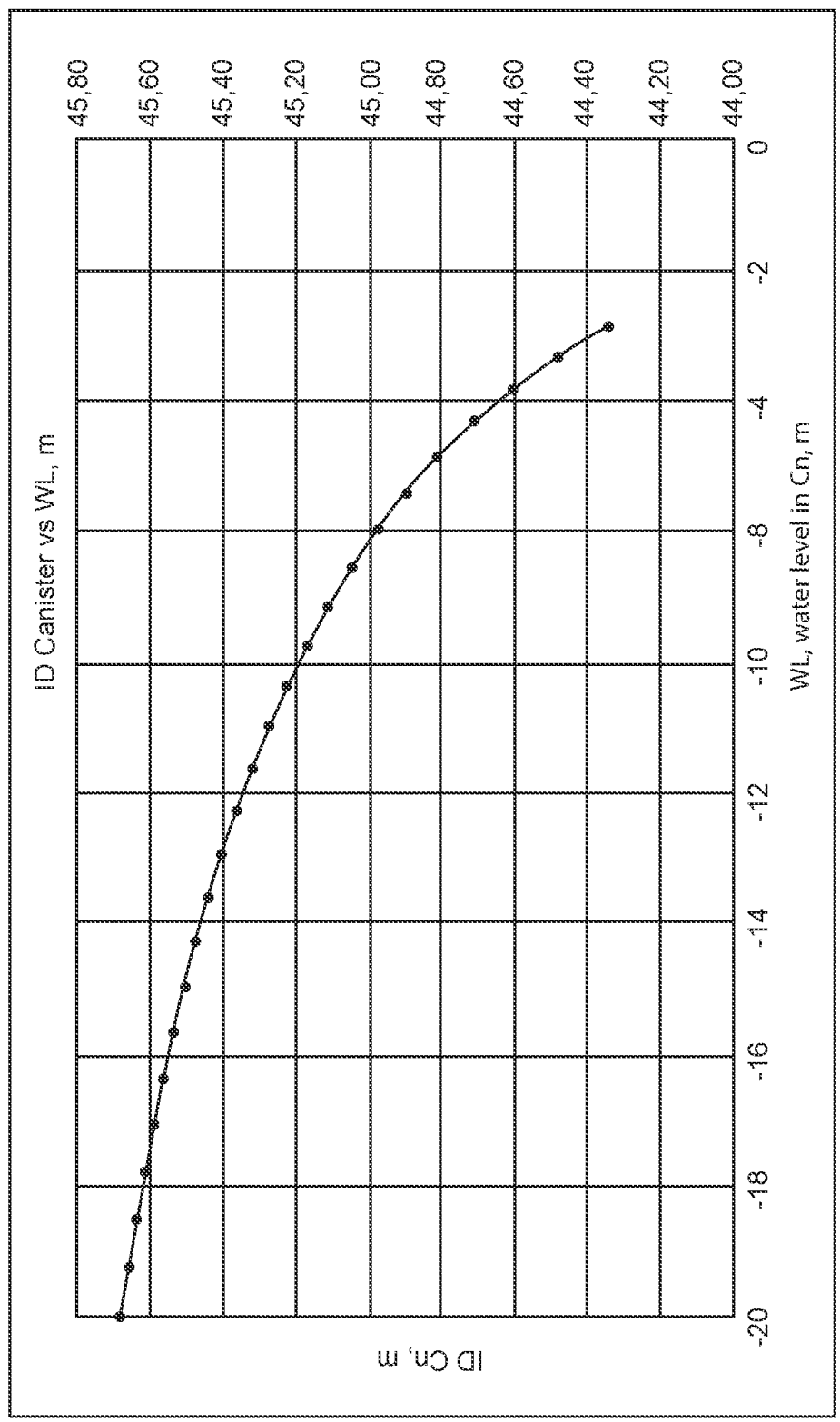

FIG. 8 shows curve plots from columns F and I from the spreadsheet in FIG. 7A-D. The horizontal axis 'WL' refers to the water level in the rise canister from level hL, cell B5, FIG. 6, and cell F2, FIG. 7A-D, which is minus 20 metres and rising to minus 4.8 metres, cell F26, FIG. 7A-D. The vertical axis 'ID Cn' refers to the reduction of the inner diameter of the rise canister stated in FIG. 7A-D from cell I2 to I26.

Figure 9:
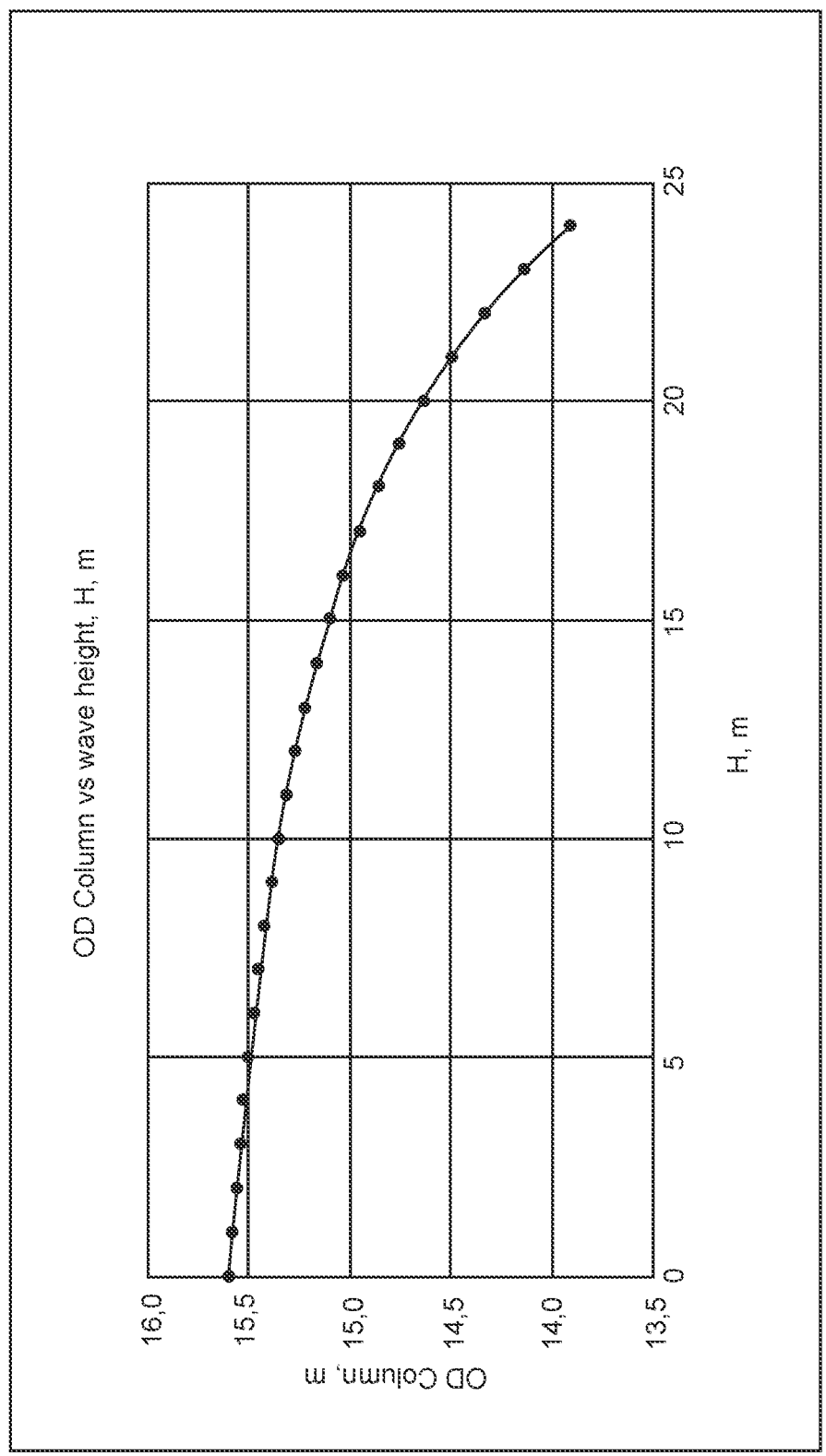

FIG. 9 shows curve plots from columns A and Q from FIG. 7A-D. The horizontal axis 'H' indicates the wave height values from cell A2 to A26 from FIG. 7A-D, and the vertical axis 'OD Column' shows the reduction in the column's outer diameter with increasing wave height stated in cells Q2 to Q26 in FIG. 7A-D.

Figure 10:
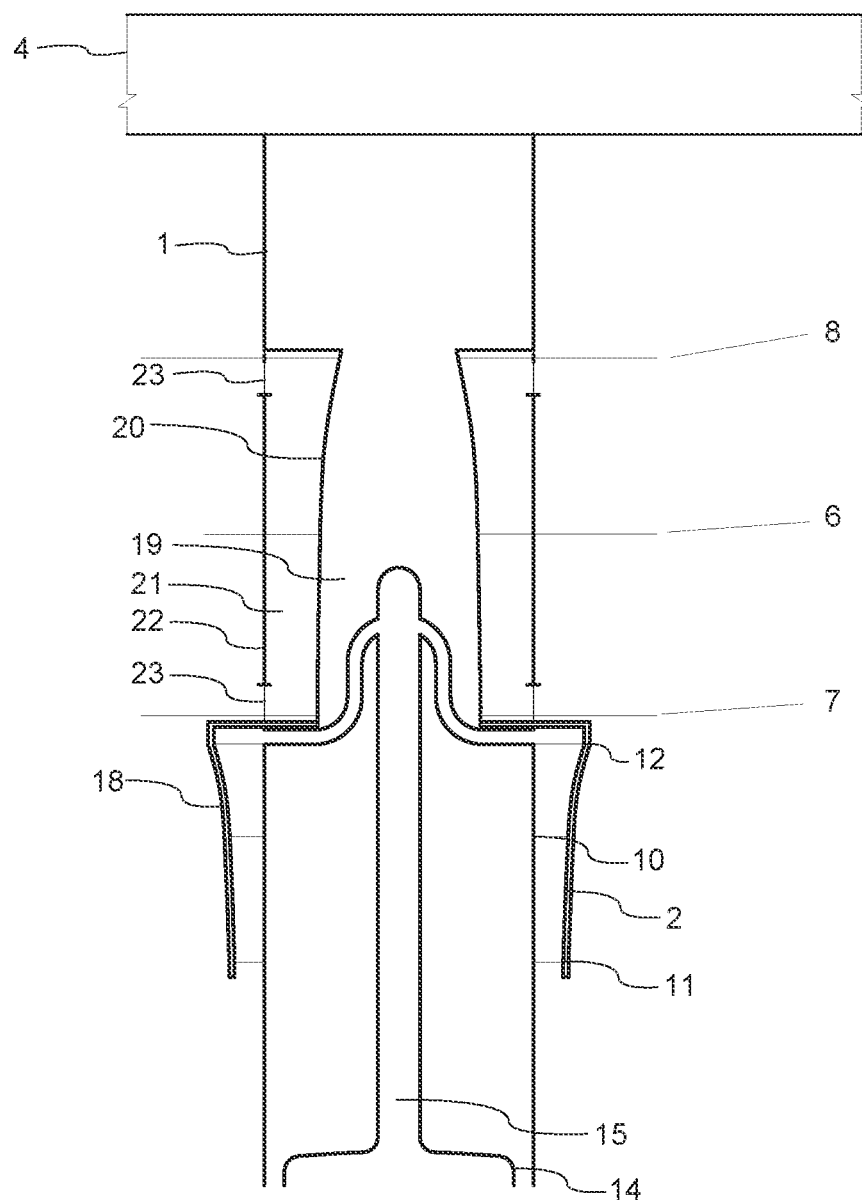
Figure 12C:
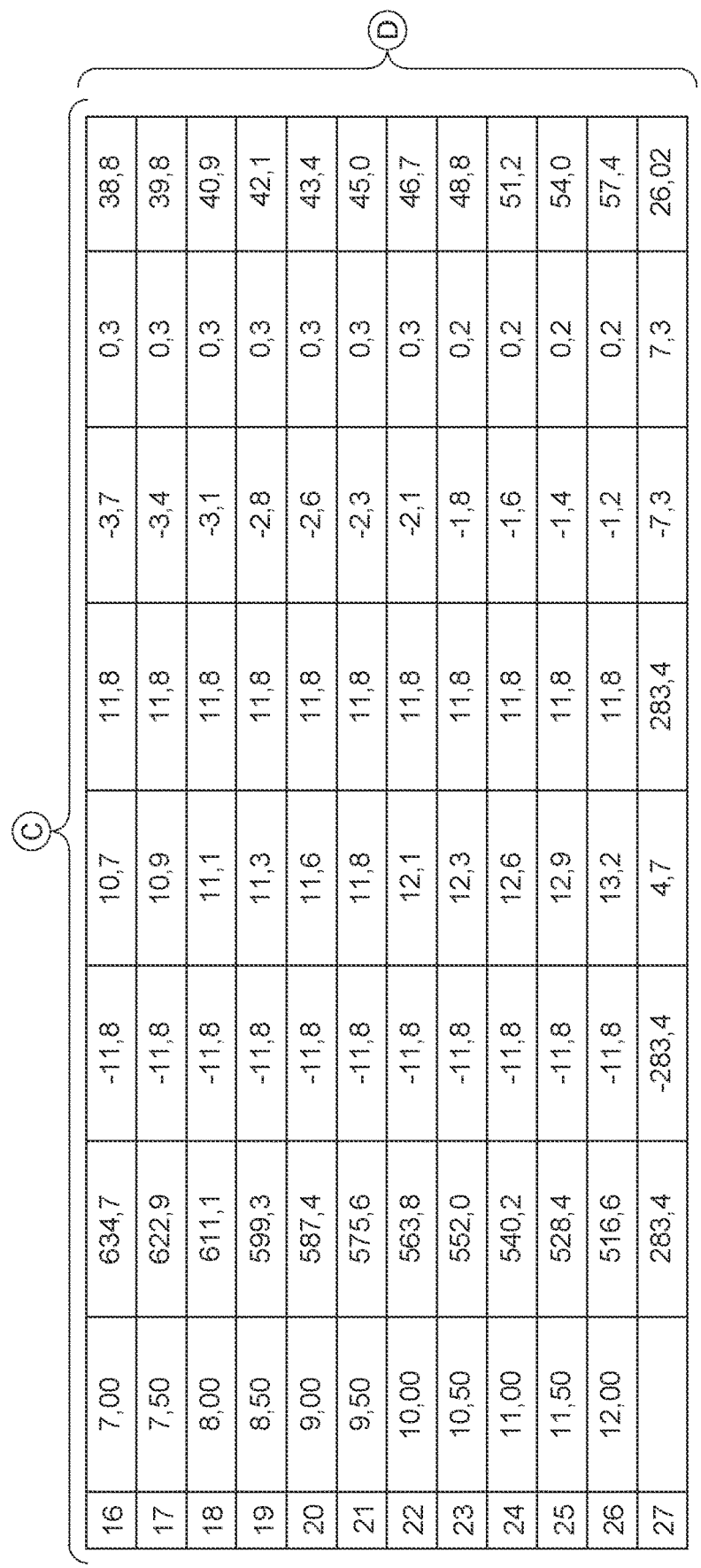

FIG. 10 shows a vertical centre section of one of the columns for the platform illustrated in FIG. 2. The reference numerals 1 to 15 have the same designations as in FIGS. 4 and 5. In FIG. 10, the rise canister 2 is built concentrically on the outside of the column 1. For the column through the rise canister to the widest possible extent to keep its structural integrity, the rise canister 2 has the curvature 18 for increasing water surface at rising level facing outwards unlike the previous example in FIG. 4 (reference numeral) 13. For the system to require the smallest air reservoir possible, the column is divided into a dry and a wet section through the splash zone. The dry section 19 is encompassed by the curved bulkhead 20. The wet section 21 is encompassed by the column wall 22 on the outside and the bulkhead 20 inwards. For the column to maintain its structural integrity through the splash zone, the necessary ventilation area for the wet section is secured through the openings, the scuppers 23.

A mathematical description of the curvature of the outer diameter in the rise canister 18 and the outer diameter 20 of the dry section 19 in the column 1 is demonstrated through the calculations in FIGS. 11, 12A-12D and 13A and 13B.

FIG. 11 shows the initial constants in cells B1 to B8 for the spreadsheet in FIGS. 12A-D. The values in cells B9 to B12 are calculated on the basis of these constants.

Explanation of the Columns in the Spreadsheet in FIGS. 12A, 12B, 12C, and 12D:

Column A calculates the wave height from 0 in cell A2 to 12 $m$ in cell A26, based on the constants from cells B3 and B6 in FIG. 11.

Column B calculates the air volume in the system at rising wave height, B2 is copied from cell B7, FIG. 11. Cells B3 to B26 calculate the air volume at each increment of the increasing displacement of the column at increasing wave height.

Column C states the incremental reduction of the air volume and appears by the parallel value in column B being subtracted from the previous one, for example the cell value is C3=B3 minus B2.

Column D calculates the hydrostatic pressure height above the water surface in the rise canister. Cell D2 is copied from cell B4 in FIG. 11. The value in cell D3 is calculated by dividing the constant of cell B12 in FIG. 11 by the parallel one from column B, for example D3=the constant B12 divided by B3.

Column E states the incremental increase of the water volume in the rise canister, which are the same values as in column C with opposite sign.

Column F calculates the incremental water level in the rise canister. The value in F2 is the same as in cell D2 with opposite sign. The value in cell F3 appears by the parallel value in column D being subtracted from the parallel value in column D, for example F3=A3 minus D3.

Column G calculates the incremental increase of the water level in the rise canister, where for example G3=−F2 plus F3.

Column H calculates the area of the rise canister for each level. The values appear by the parallel values in column E being divided by the parallel values in column G, for example H3=E3 divided by G3. H2 is extrapolated from the values in H3 and H4, H2=H3−(H4−H3).

Column I calculates the diameter of the rise canister for each level as a function of the areas in column H and the constant from cell B9 in FIG. 11. For example I2=2*√((B9 FIG. 11+H2)/π).

Column J calculates the increase of the area in the rise canister for each level, where the value in J3 appears by the parallel value in column H being subtracted from the previous one, J3=H3 minus H2.

Column K calculates the air pressure in the rise canister in kPa for each level, for example K2=D2 multiplied by the constant in cell B8, FIG. 11, multiplied by g (9.81).

Column L calculates the air pressure increase kPa in the rise canister for each level, where for example L3=K3−K2.

Column M calculates the increasing buoyancy effect in kN of the increasing air pressure and the increasing area of the water surface in the rise canister, where for example M3=J3 multiplied by L3.

Column N calculates the necessary ballast water volume in m3 to compensate for the increasing buoyancy effect, where for example N3=M3/(g*constant B8 in FIG. 11).

Column O calculates the area increase of the water surface around the column, which is necessary to provide room for this ballast water, where for example O3=N3 divided by the constant B6 in FIG. 11.

Column P calculates the new wet area of the column for each level, where for example P3=O3+P2.

Column Q then calculates the new dry area of the column for each level, where for example Q3=value of cell B9 minus the value of cell P3.

Finally, the new diameter for the column's dry area for each level is calculated in column R, where R3=2*√(Q3/π).

Figure 13A:
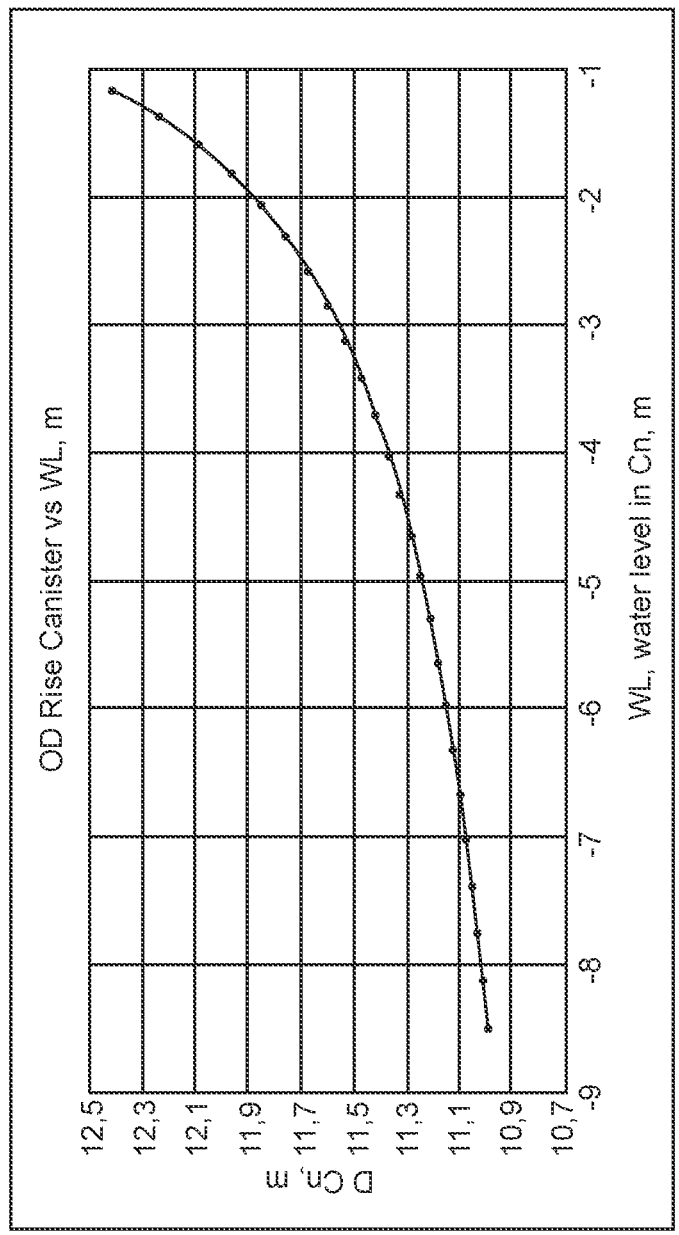
Figure 13B:
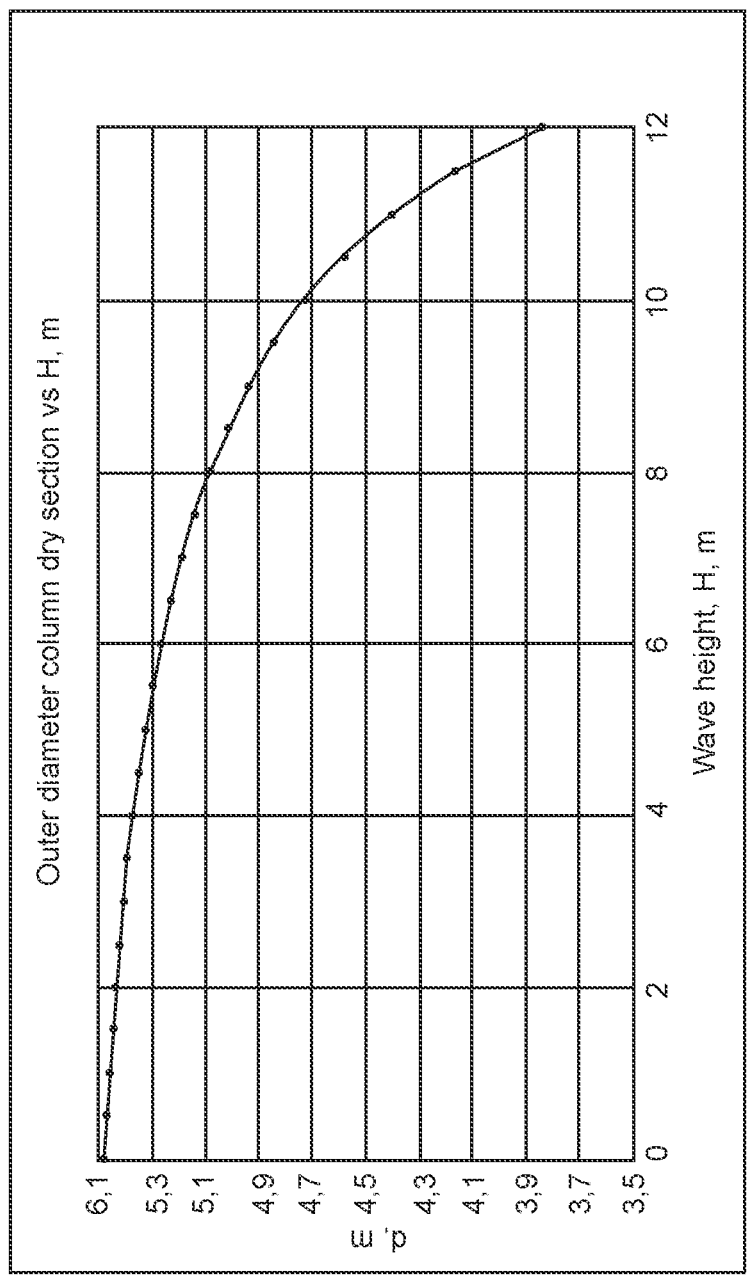

The upper part of FIGS. 13A and 13B shows the curve plots from columns I and F from the spreadsheet in FIGS. 12A-12D. The horizontal axis 'WL' refers to the water level in the rise canister from level hL, cell B6, FIG. 11, and cell F2, FIGS. 12A-12D, which is minus 8.5 metres and rising to minus 1.2 metres, cell F26, FIGS. 12A-12D. The vertical axis 'ID Cn' refers to the increase of the outer diameter of the rise canister stated in FIGS. 12A-12D from cells I2 to I26.

The curve plots in the lower part of FIGS. 13A and 13B are from columns A and R from FIGS. 12A-12D. The horizontal axis 'H' indicates the wave height values from cells A2 to A26 from FIGS. 12A-12D, and the vertical axis 'd' shows the reduction in the column's outer diameter of the dry area with increasing wave height stated in cells R2 to R26 in FIGS. 12A-12D.

Figure 14:
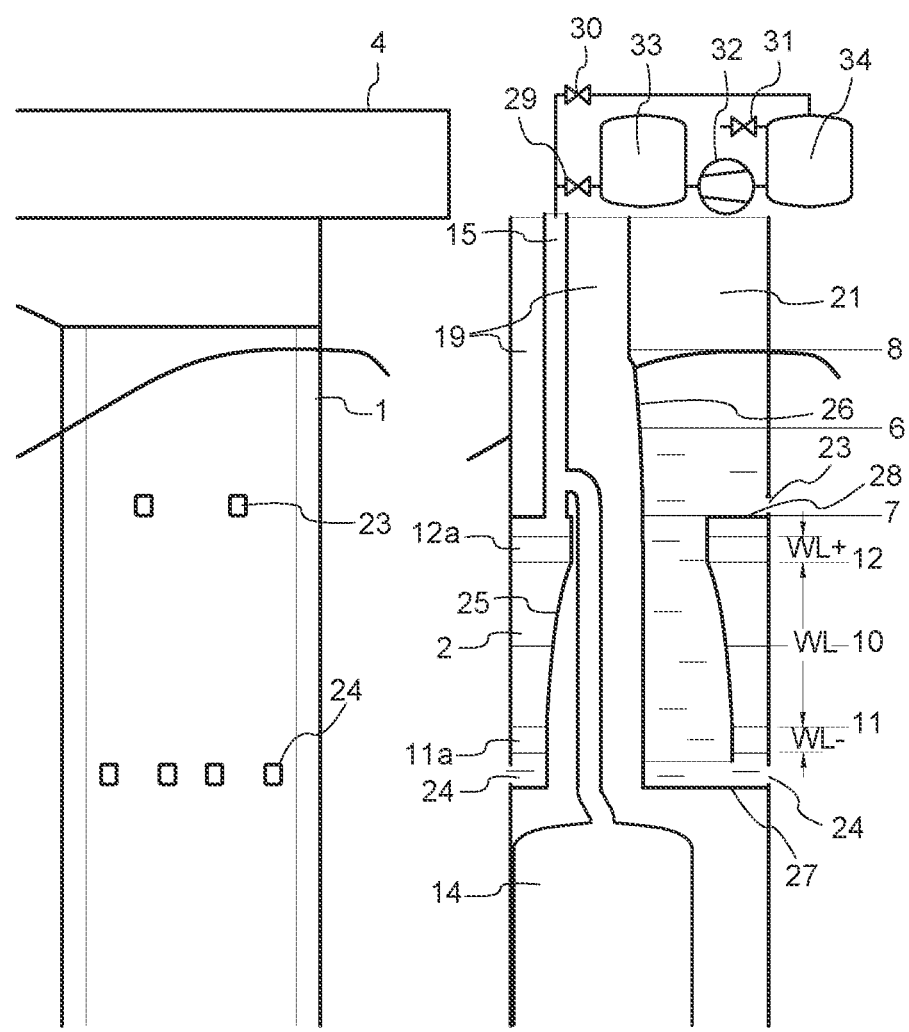

FIG. 14 shows the outside of one of the columns for the four-column platform illustrated in FIG. 3 as well as a vertical cross section of it. The reference numerals 1 to 23 refer to the same as in FIGS. 4 and 10. Reference numerals 11a and 12a show additions for the water level in the rise canister at the bottom and the top. Here the rise canister 2 is built into the column 1. The rise canister here constitutes the space between the outer walls of the column and the curve bulkheads 25 that form a quadratic core inside the column, and the rise canister volume increases with increasing height (i.e. upwards in the direction of the deck 4). The scuppers 24 connect the rise canister to the sea. The deck 27 isolates the wet area in the rise canister from the internally dry column below. The deck 28 constitutes the roof of the rise canister and the air volume above the water surface coupled to the pipe 15 and the chamber (the gas (air) reservoir) 14. The pipe (opening) 15 is further connected to the arrangement above, which is shown schematically. FIG. 14 is best read together with FIGS. 15 and 16, which are three-dimensional illustrations. A first valve 29 is coupled to a first tank 33, which has been stored with air with a higher pressure than the highest pressure in the rise canister at level 12. Furthermore, the pipe 15 is also coupled to a second valve 30, which is coupled to a second tank 34, which is stored at a lower pressure than the pressure in the rise canister at level 11. A third valve 31 is for ventilation to the atmosphere. The compressor 32 is a low-pressure compressor type with a high-volume capacity. The compressor maintains the overpressure in the first tank 33. Control with opening and closure of the valves 29, 30 and 31 is intended to be coupled to a control system with entry data from geostationary references. When, due to hydrodynamic inertia effects as well as viscous hydrodynamic frictions, the platforms are not kept entirely calm, the additional capacities marked WL− and WL+, 11a and 12a can be activated and adjust for this. The system can be equipped with algorithms developed for this purpose, which can function predicatively and individually independently for the 4 columns keep the platform stable horizontally and heave-neutral.

FIG. 17 shows the initial constants in cells C1 to C9 for the spreadsheet in FIGS. 18A-18D. The values in cells C1 0 to C14 are calculated on the basis of these constants.

Figure 15:
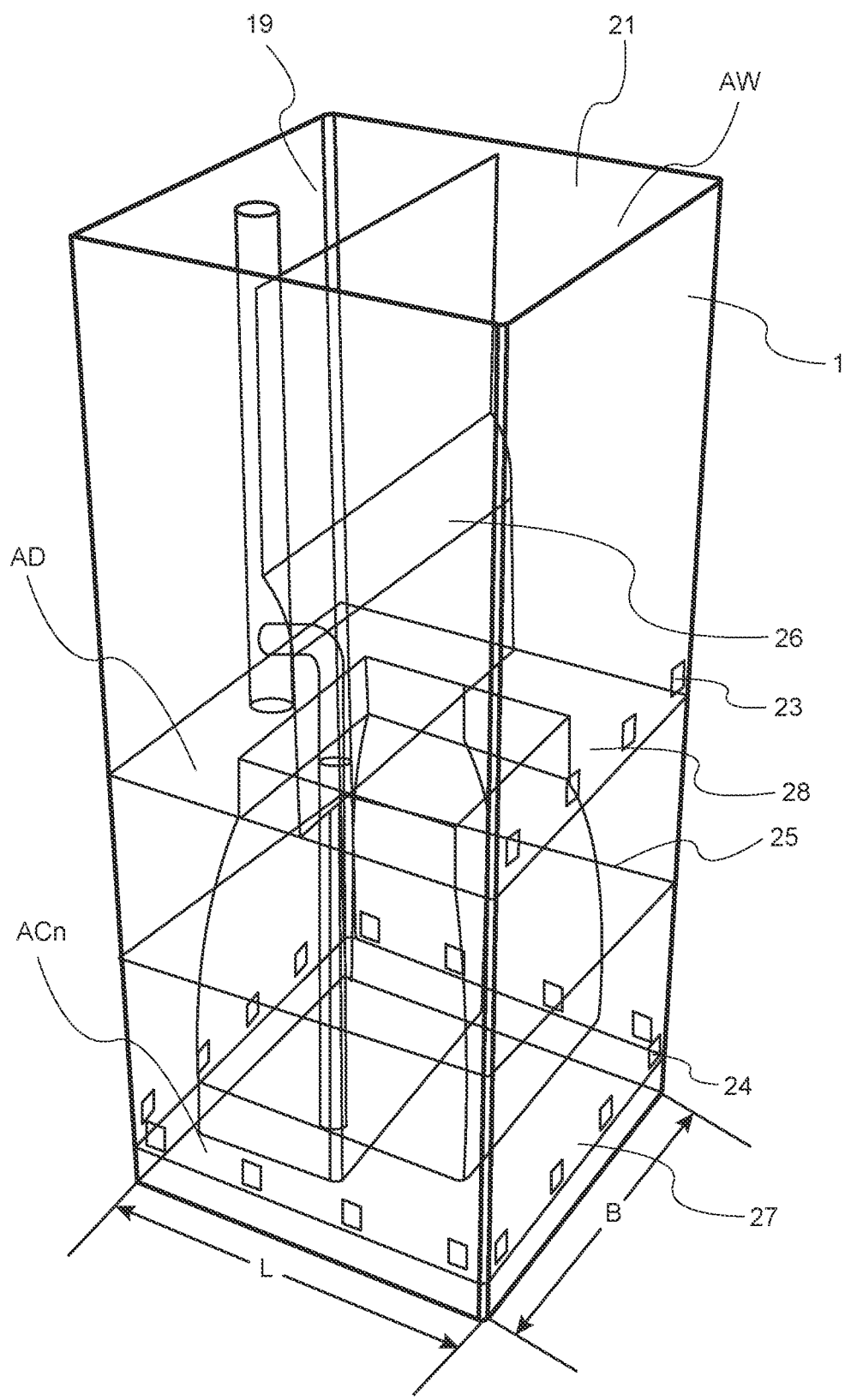
Figure 16:
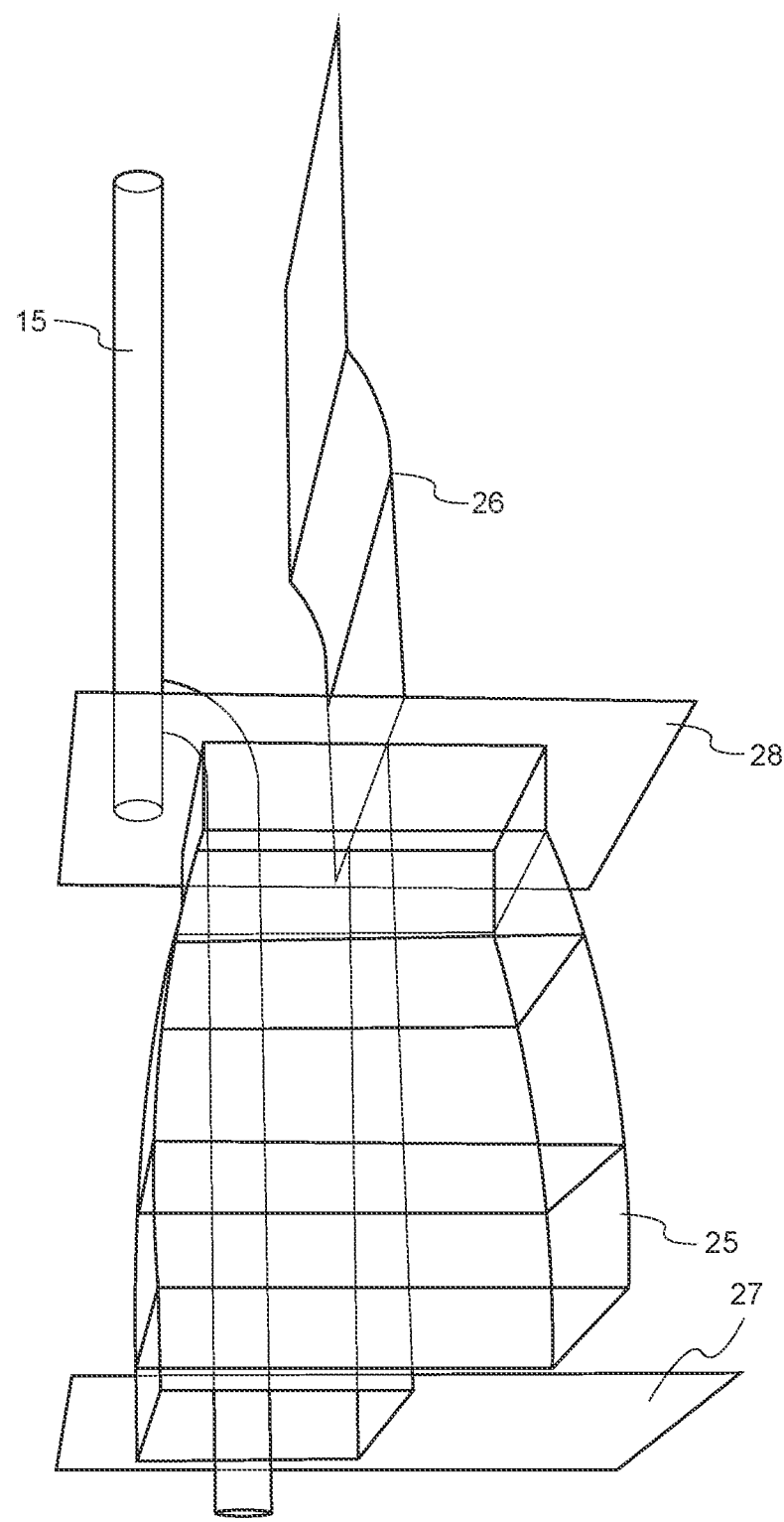
Figure 18C:
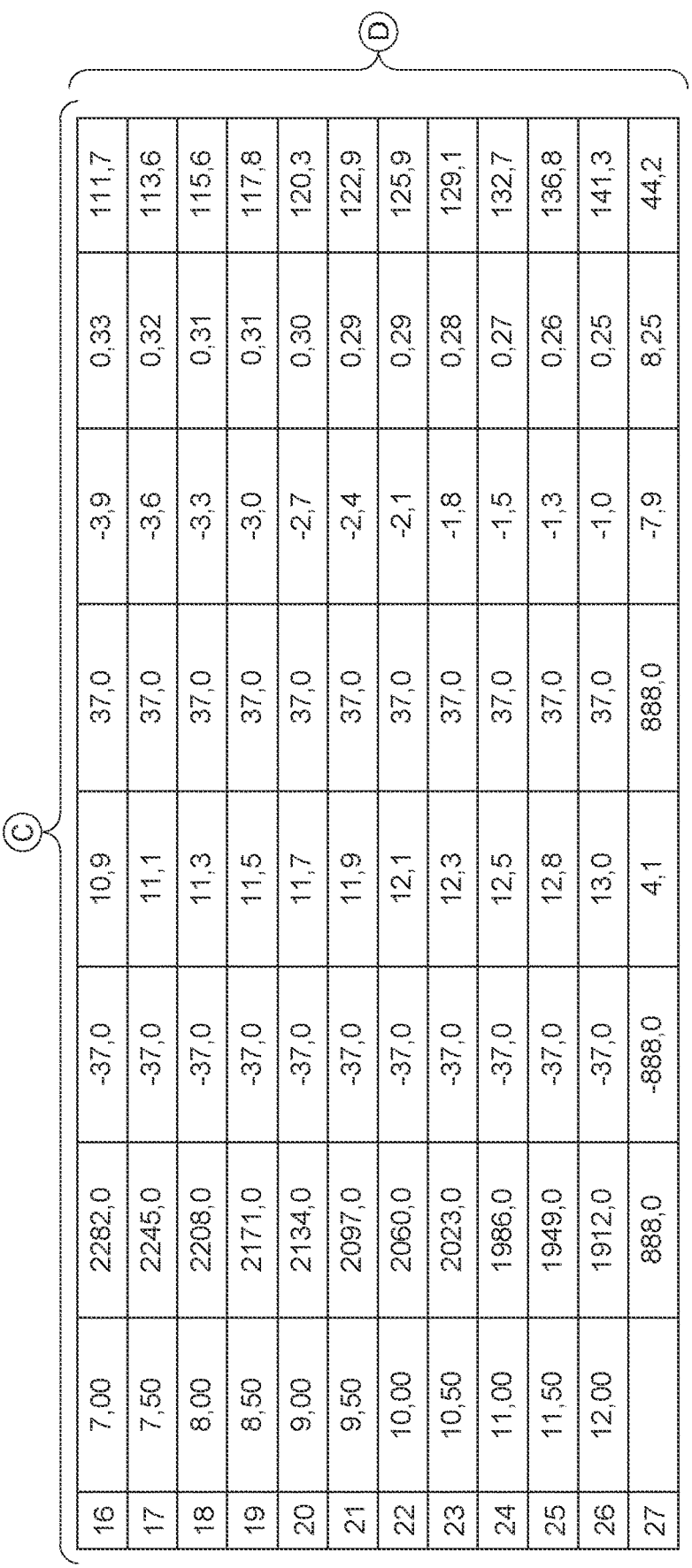

The explanation for the columns in the spreadsheet in FIGS. 18A, 18B, 18C, and 18D is in principle the same as for FIGS. 12A-D, until column H. In column I in FIGS. 18A-18D, the outer linear measures on the sides of the quadratic core that constitutes in inner walls of the rise canister are calculated, as it here, cf. FIGS. 14, 15 and 16, is built into a square column.

Furthermore, the other difference is that in column Q, the linear measure is calculated at a distance from the outer wall of the column to the curved bulkhead that separates the wet and the dry area of the column in the column's splash zone.

Figure 19A:
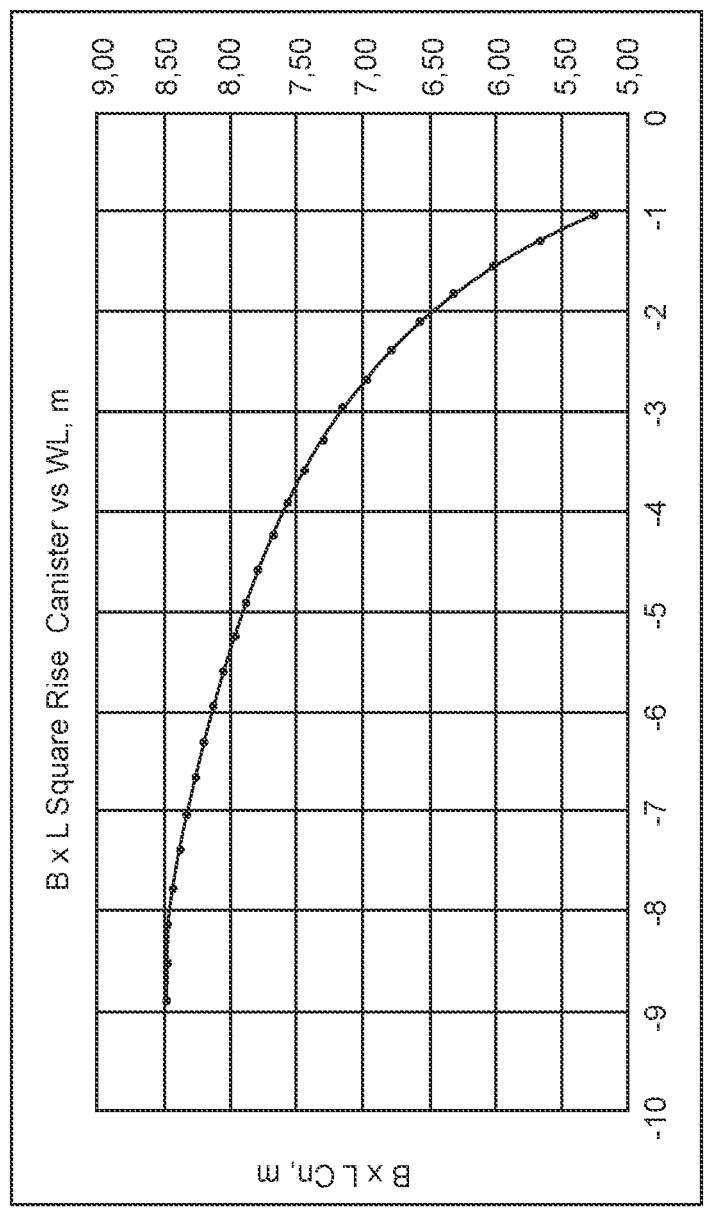
Figure 19B:
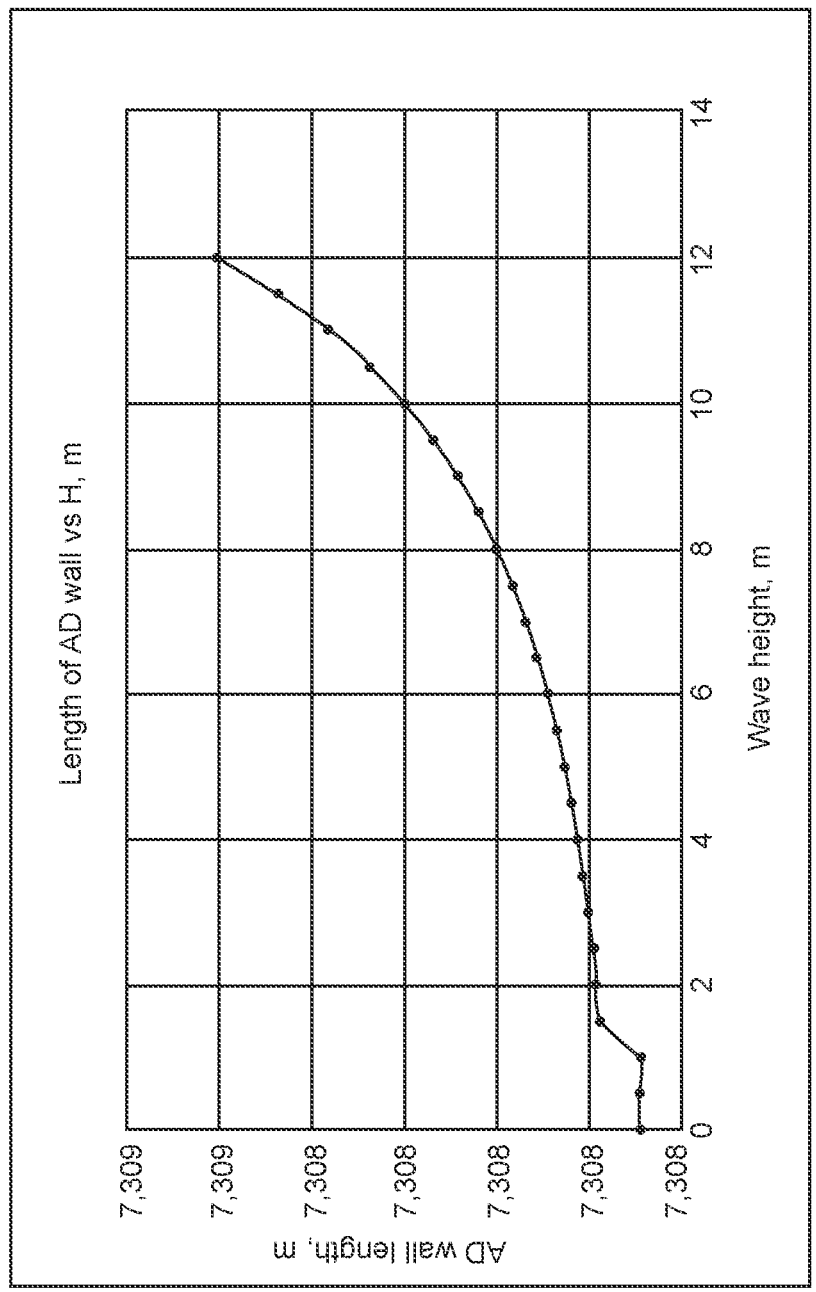

The upper part of FIGS. 19A and 19B shows the curve plots from columns I and F from the spreadsheet in FIGS. 18A-18D. The horizontal axis 'WL' refers to the water level in the rise canister from level hL, cell C5, FIG. 17, and cell F2, FIGS. 18A-18D, which is minus 8.9 metres and rising to minus 1.0 metre, cell F26, FIGS. 18A-18D. The vertical axis 'B×L' refers to the increase of the outer linear measures of the sides of the quadratic core that constitute the inner walls of the rise canister stated in FIGS. 18A-18D from cells I2 to I26.

The curve plots in the lower part of FIGS. 19A-19B are from columns A and Q from FIGS. 18A-18D. The horizontal axis 'Wave height' indicates the wave height values from cells A2 to A26 from FIGS. 18A-18D, and the vertical axis 'AD wall length' shows the increase of the linear measure of the column outer wall to the curved bulkhead that separates the column's wet and dry area in the column splash zone, stated in cells Q2 to Q26 in FIGS. 18A-18D.

The invention claimed is:

1. A floating platform, comprising:
    a structure, which is carried by one or more columns placed on one or more buoyancy bodies,
        wherein the one or more columns comprise a built-in rise canister, equipped with at least one opening in a lower part, so that fluid communication is provided between the rise canister and a body of water, and
        wherein the rise canister volume increases with increasing height so that the rise canister has increasing water surface area at rising water level.

2. The floating platform according to claim 1, wherein the rise canister at an upper part is in gas connection with a gas-filled chamber.

3. The floating platform according to claim 1,
    wherein the rise canister is gas-connected with a first tank via a first valve, wherein the first tank contains a gas and is configured to have a higher pressure than the highest pressure in the rise canister when the water in the rise canister is at an upper level, and
    wherein the rise canister is gas-connected with a second tank via a second valve, and wherein the second tank contains a gas, for example air, and is configured to have a lower pressure than the pressure in the rise canister when the water in the rise canister is at a lower level.

4. The floating platform according to claim 3, wherein the second tank comprises a third valve for ventilation to a surrounding environment.

5. The floating platform according to claim 3, further comprising a compressor that is gas-connected with the first tank and is configured to maintain an overpressure in the first tank.

6. The floating platform according to claim 1, wherein the one or more columns at a part that is above the rise canister have an outer diameter, which decreases upwards.

7. The floating platform according to claim 1, wherein the rise canister is arranged concentrically with and on the outside of the column.

8. The floating platform according to claim 1, wherein in the platform is a semisubmersible platform.

9. The floating platform according to claim 3, wherein the gas comprises air.

* * * * *